United States Patent
Thomas

(10) Patent No.: US 9,511,739 B2
(45) Date of Patent: Dec. 6, 2016

(54) FENDER LOCATED PEDESTRIAN PROTECTION AIRBAG

(71) Applicant: GM Global Technology Operations LLC, Detroit, MI (US)

(72) Inventor: Scott D. Thomas, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/255,751

(22) Filed: Apr. 17, 2014

(65) Prior Publication Data

US 2014/0332303 A1    Nov. 13, 2014

Related U.S. Application Data

(60) Provisional application No. 61/820,982, filed on May 8, 2013.

(51) Int. Cl.

| | |
|---|---|
| *B60K 28/10* | (2006.01) |
| *B60R 21/36* | (2011.01) |
| *B60R 21/34* | (2011.01) |
| *B60R 21/013* | (2006.01) |
| *B60R 21/38* | (2011.01) |
| *E05D 7/00* | (2006.01) |

(52) U.S. Cl.
CPC ............. *B60R 21/36* (2013.01); *B60K 28/10* (2013.01); *B60R 21/013* (2013.01); *B60R 21/34* (2013.01); *B60R 21/38* (2013.01); *E05D 7/00* (2013.01); *Y10T 16/522* (2015.01)

(58) Field of Classification Search
CPC ......... B60K 28/10; B60R 21/34; B60R 21/36; B60R 21/38; B60R 21/013

USPC .................................................. 180/271, 274
See application file for complete search history.

(56) References Cited

U.S. PATENT DOCUMENTS

| | | | |
|---|---|---|---|
| 4,941,678 A | 7/1990 | Lauritzen et al. | |
| 6,182,782 B1 | 2/2001 | Matsuura et al. | |
| 6,415,882 B1 * | 7/2002 | Schuster ................. | B60R 21/38 16/223 |
| 6,497,302 B2 | 12/2002 | Ryan | |
| 7,000,720 B2 * | 2/2006 | Polz et al. .................. | 180/69.21 |
| 7,325,642 B2 | 2/2008 | Roux et al. | |
| 7,410,027 B2 * | 8/2008 | Howard ......................... | 180/274 |
| 7,413,049 B2 * | 8/2008 | Schramm et al. ............ | 180/274 |

(Continued)

FOREIGN PATENT DOCUMENTS

| | | |
|---|---|---|
| CN | 1605508 A | 4/2005 |
| CN | 100336685 C | 9/2007 |

(Continued)

OTHER PUBLICATIONS

German Office Action dated Dec. 12, 2014; Application No. 102014106153.9 ; Applicant: GM Global Technology Operations LLC ; 7 pages.

(Continued)

*Primary Examiner* — Faye M Fleming
(74) *Attorney, Agent, or Firm* — BrooksGroup

(57) ABSTRACT

A number of variations may include a product comprising an airbag which propels a moving member that releases a hood hinge mechanism upon deployment and which deploys a cushion to provide pedestrian protection from at least one of a rearward region of the hood, a lower windshield, an A-pillar, an outboard region of a hood, or a fender.

19 Claims, 13 Drawing Sheets

(56) References Cited

U.S. PATENT DOCUMENTS

| | | | |
|---|---|---|---|
| 7,954,588 B2* | 6/2011 | Inomata et al. | 180/274 |
| 8,006,997 B2 | 8/2011 | Inoue et al. | |
| 8,770,334 B2* | 7/2014 | Rick | 180/274 |
| 2003/0062208 A1 | 4/2003 | Hamada et al. | |
| 2003/0121710 A1* | 7/2003 | Hamada et al. | 180/274 |
| 2003/0189319 A1 | 10/2003 | Soderquist | |
| 2005/0206139 A1 | 9/2005 | Mori et al. | |
| 2005/0279550 A1* | 12/2005 | Saville et al. | 180/69.21 |
| 2006/0175809 A1 | 8/2006 | Yamaji et al. | |
| 2006/0260855 A1* | 11/2006 | Yoshitake | 180/69.21 |
| 2009/0127016 A1 | 5/2009 | Hayashi et al. | |
| 2010/0164203 A1 | 7/2010 | Inoue et al. | |

FOREIGN PATENT DOCUMENTS

| | | |
|---|---|---|
| CN | 101374705 A | 2/2009 |
| CN | 201777216 U | 3/2011 |
| CN | 102555978 A | 7/2012 |
| DE | 10316827 A1 | 11/2003 |
| DE | 10316828 A1 | 11/2003 |
| DE | 102007056277 A1 | 6/2009 |
| DE | 102010013606 A1 | 10/2010 |
| EP | 2050635 A2 | 4/2009 |
| EP | 2481647 A1 | 8/2012 |
| JP | H0585417 A | 4/1993 |
| JP | 2003306098 A | 10/2003 |

OTHER PUBLICATIONS

Chinese Office Action dated Nov. 30, 2015; Application No. 201410192091.3; Applicant: GM Global Technology Operations LLC.; 10 Pages.

Chinese Office Action dated Dec. 14, 2015;Application No. 201410192119.3; Applicant: GM Global Technology Operations LLC.; 7 pages.

Chinese Office Action dated Jun. 24, 2016; Application No. 201410192119.3; Applicant: GM Global Technology Operations LLC.; 3 Pages.

Chinese Office Action dated Jul. 27, 2016; Application No. 201410192091.3; Applicant: GM Global Technology Operations LLC.; 11 Pages.

Chinese Office Action dated Aug. 15, 2016; Application No. 201410192128.2; Applicant: GM Global Technology Operations LLC.; 9 Pages.

* cited by examiner

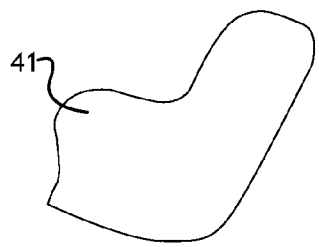
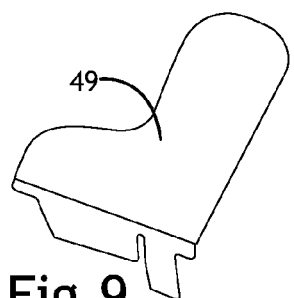
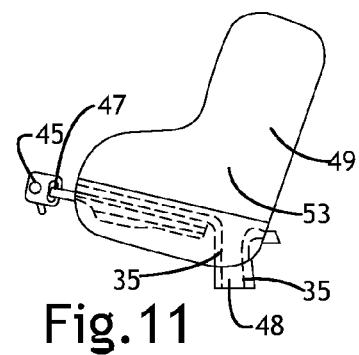
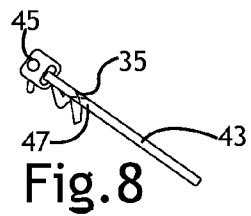
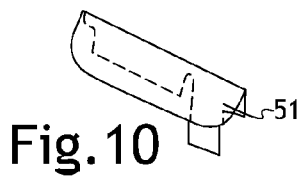
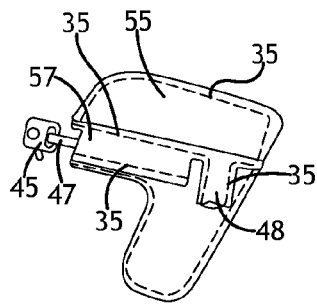
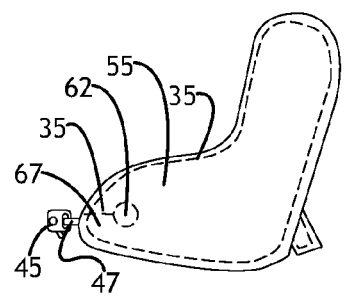
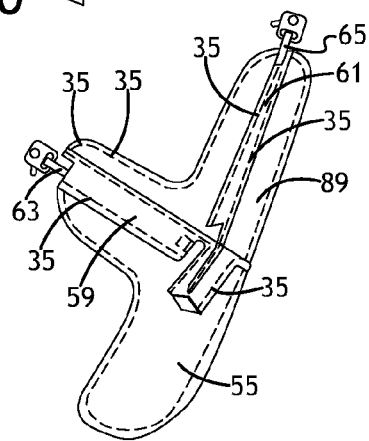
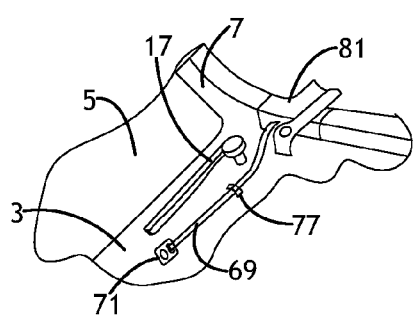
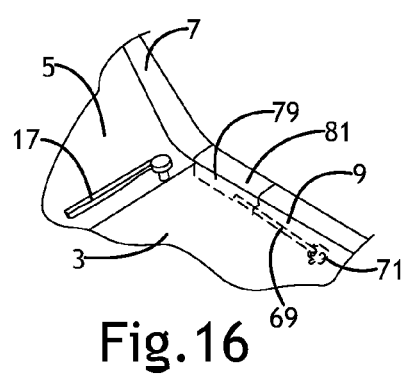

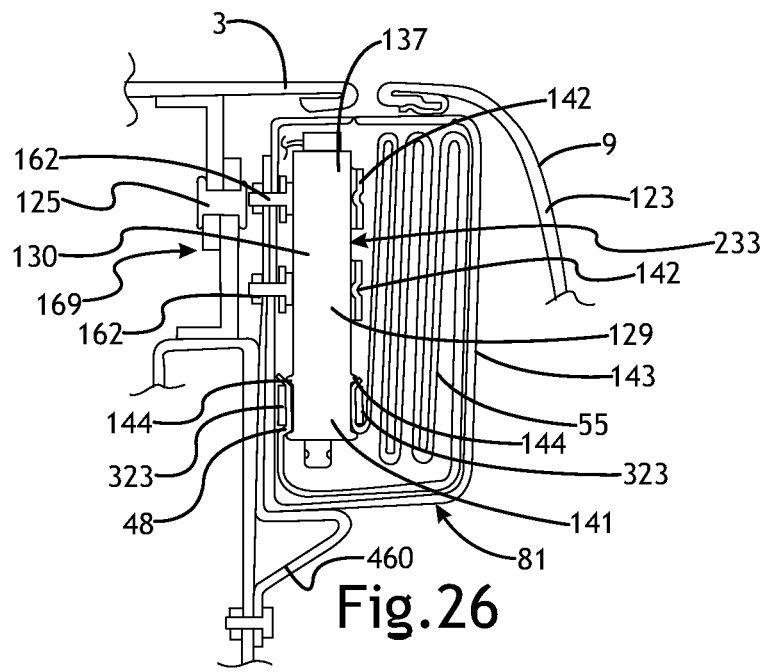
Fig.26
Fig.28
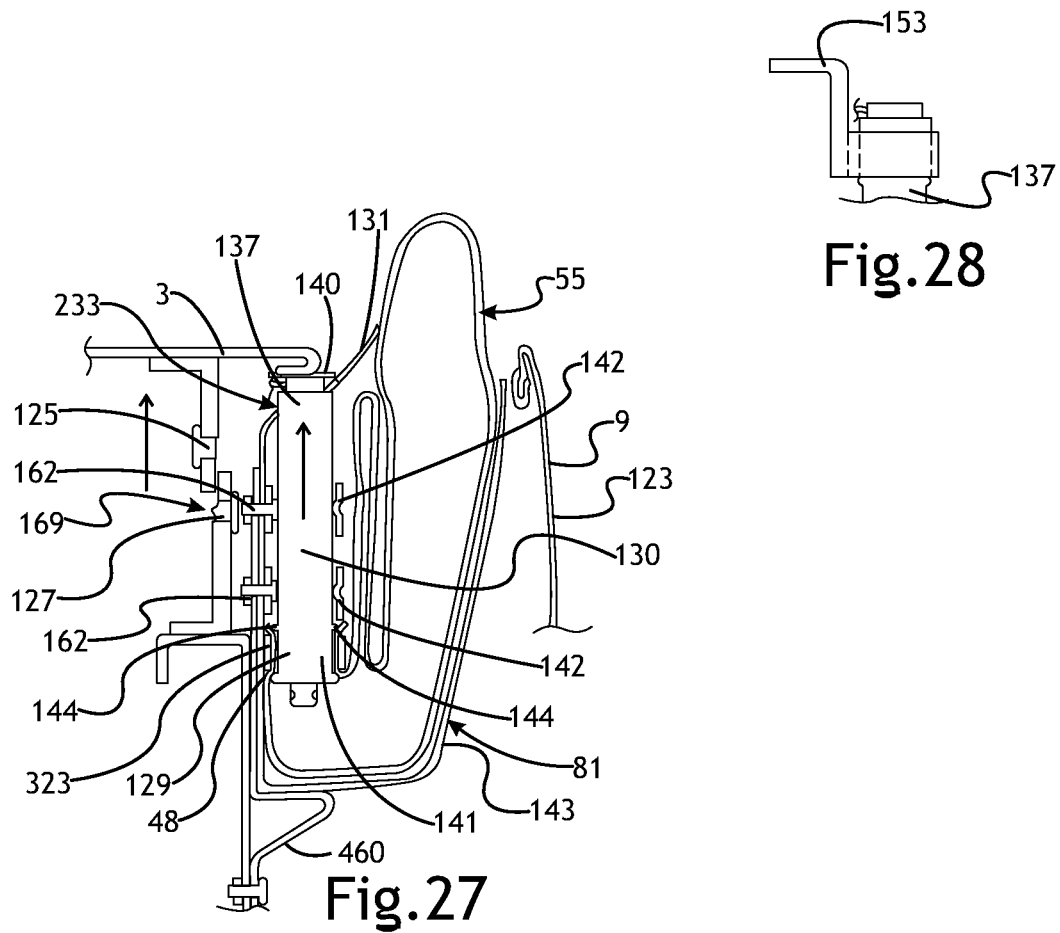
Fig.27

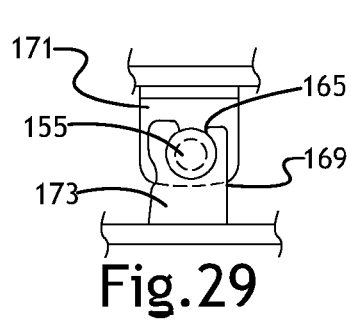
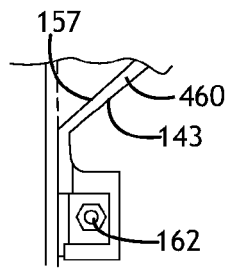
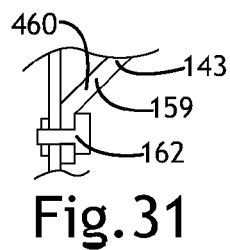
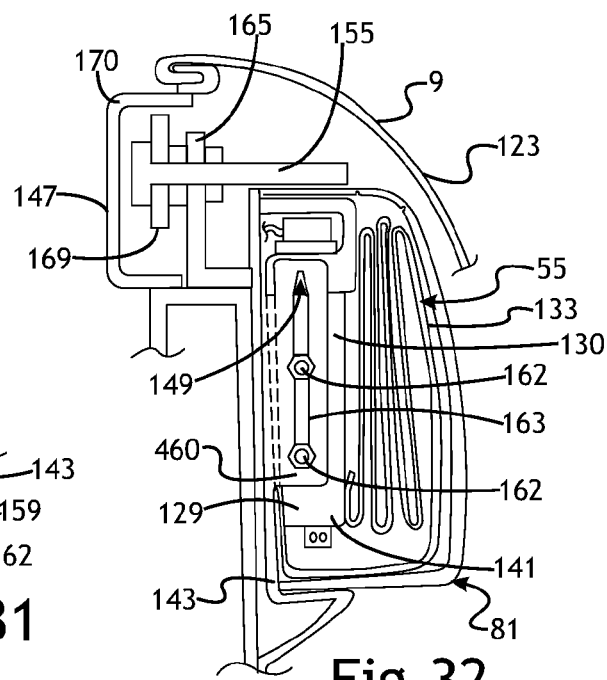
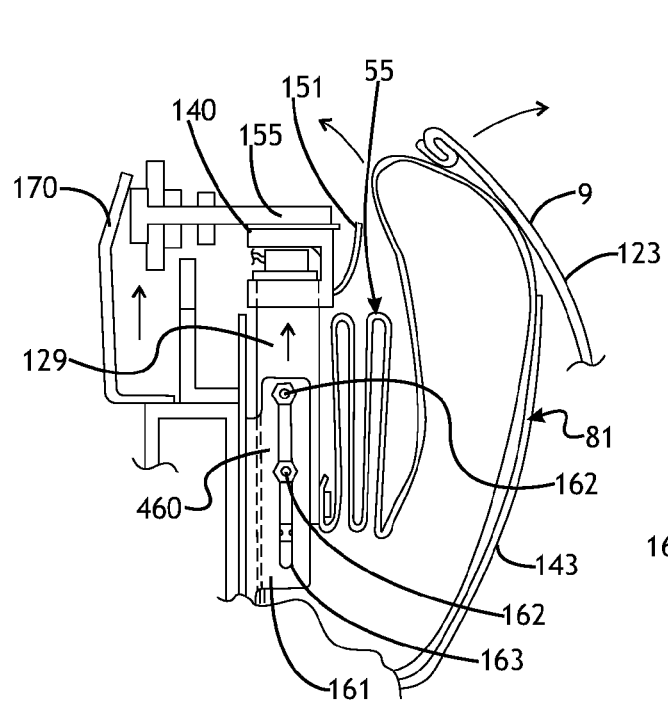
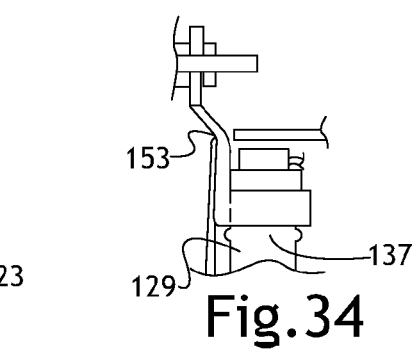
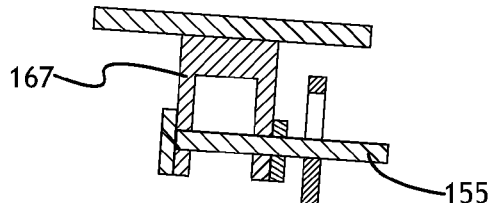

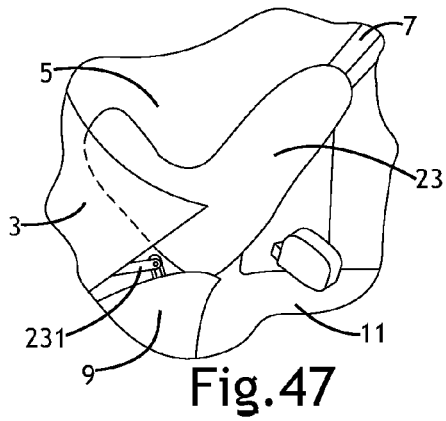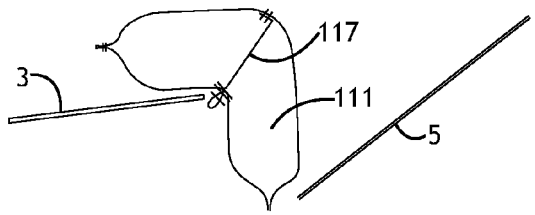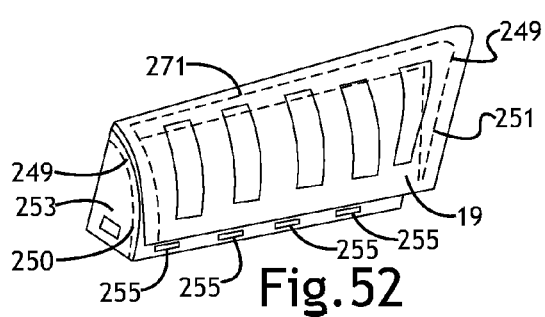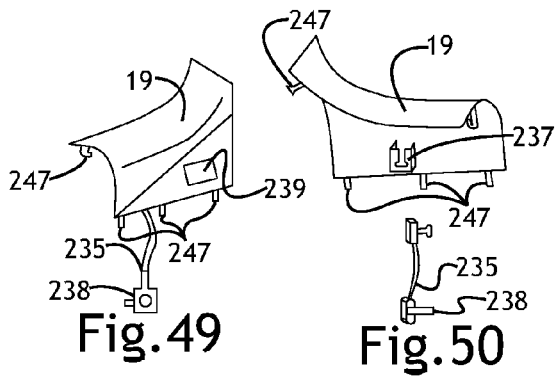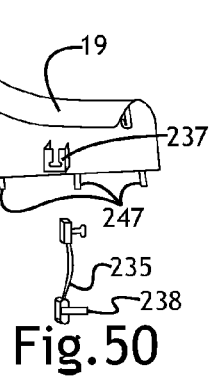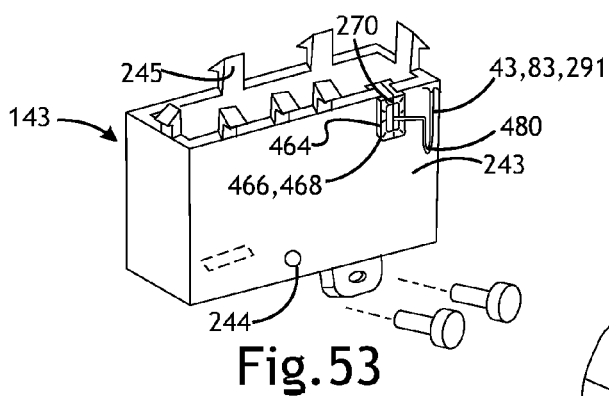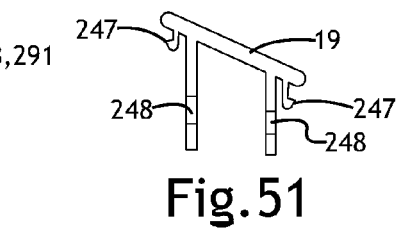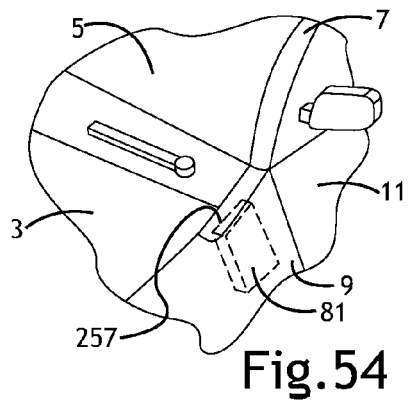

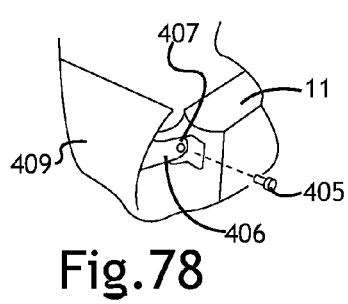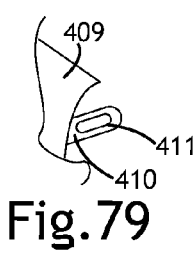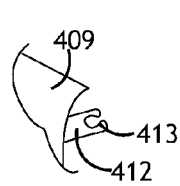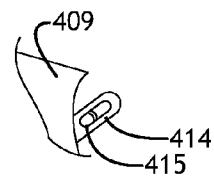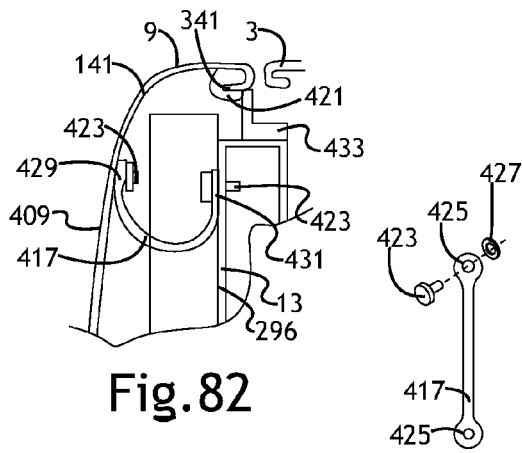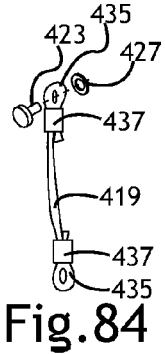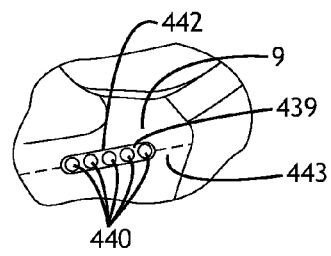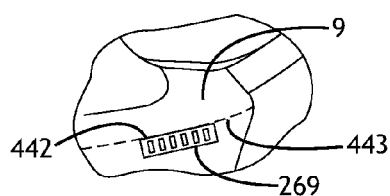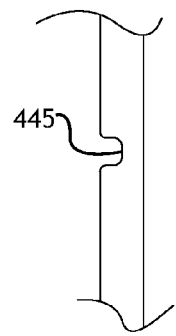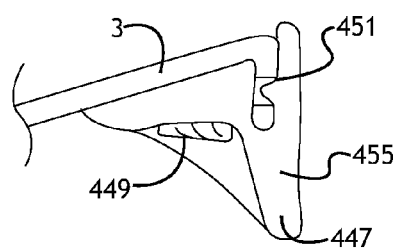

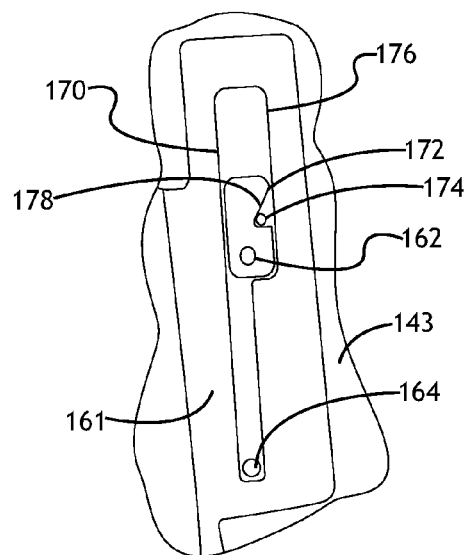
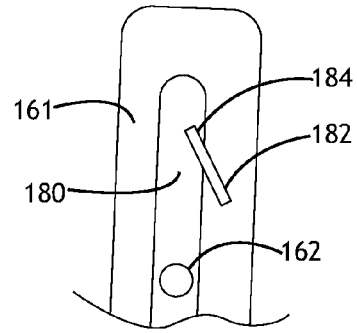
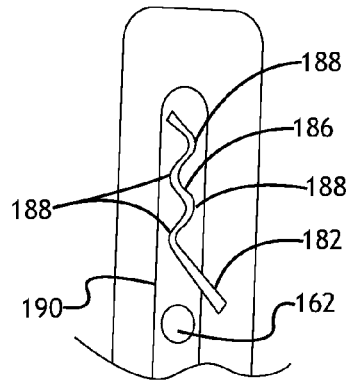
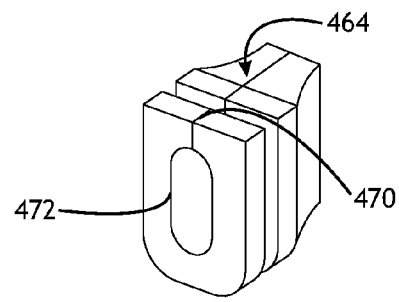
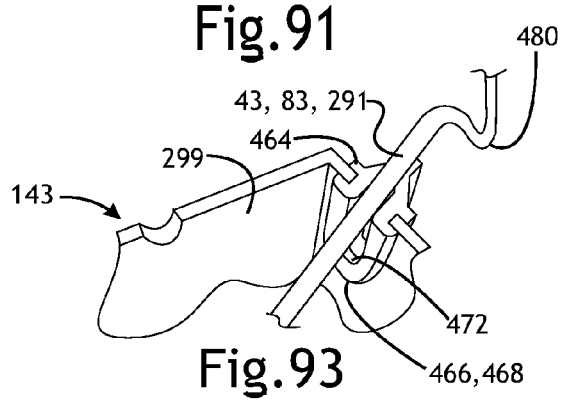
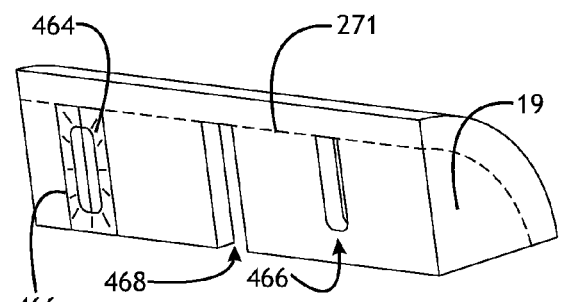

FENDER LOCATED PEDESTRIAN PROTECTION AIRBAG

CROSS-REFERENCE TO RELATED APPLICATIONS

This application claims the benefit of U.S. Provisional Application No. 61/820,982, filed May 8, 2013.

TECHNICAL FIELD

The field to which the disclosure generally relates to includes a pedestrian protection airbag.

BACKGROUND

A vehicle may have one or more airbags.

BRIEF DESCRIPTION OF THE DRAWINGS

Select examples of variations will become more fully understood from the detailed description and the accompanying drawings, wherein:

FIG. 7 illustrates a cushion panel according to a number of variations.

FIG. 8 illustrates a tether assembly according to a number of variations.

FIG. 9 illustrates a cushion panel according to a number of variations.

FIG. 10 illustrates a cushion panel according to a number of variations.

FIG. 11 illustrates a cushion panel assembly according to a number of variations.

FIG. 12 illustrates a cushion assembly according to a number of variations.

FIG. 13 illustrates a cushion assembly according to a number of variations.

FIG. 14 illustrates a cushion assembly according to a number of variations.

FIG. 15 illustrates a tether assembly attached to a vehicle structure according to a number of variations.

FIG. 16 illustrates a tether assembly position in the vehicle according to a number of variations.

FIG. 26 illustrates a sectional view of an airbag module according to a number of variations.

FIG. 27 illustrates a sectional view of an airbag module according to a number of variations.

FIG. 28 illustrates a close up of an interface feature on an inflator according to a number of variations.

FIG. 29 illustrates a close up of an airbag attachment feature according to a number of variations.

FIG. 30 illustrates a close up of an airbag attachment feature according to a number of variations.

FIG. 31 illustrates a close up of an airbag attachment feature according to a number of variations.

FIG. 32 illustrates a sectional view of an airbag module according to a number of variations.

FIG. 33 illustrates a sectional view of an airbag module according to a number of variations.

FIG. 34 illustrates a close up of an attachment device according to a number of variations.

FIG. 35 illustrates a close up of a hood hinge structure according to a number of variations.

FIG. 47 illustrates an inflated airbag according to a number of variations.

FIG. 48 illustrates an inflated airbag in relation to the vehicle according to a number of variations.

FIG. 49 illustrates an airbag deployment door according to a number of variations.

FIG. 50 illustrates an airbag deployment door according to a number of variations.

FIG. 51 illustrates a sectional view of an airbag deployment door according to a number of variations.

FIG. 52 illustrates an airbag housing according to a number of variations.

FIG. 53 illustrates an airbag housing according to a number of variations.

FIG. 54 illustrates a close up of the frontal region of a vehicle according to a number of variations.

FIG. 78 illustrates a close up of a fender according to a number of variations.

FIG. 79 illustrates a close up of a fender according to a number of variations.

FIG. 80 illustrates a close up of a fender according to a number of variations.

FIG. 81 illustrates a close up of a fender according to a number of variations.

FIG. 82 illustrates a sectional view of a fender region according to a number of variations.

FIG. 83 illustrates a tether according to a number of variations.

FIG. 84 illustrates a tether according to a number of variations.

FIG. 85 illustrates a close up of a fender region according to a number of variations.

FIG. 86 illustrates a close up of a fender region according to a number of variations.

FIG. 87 illustrates a close up sectional view of the fender according to a number of variations.

FIG. 88 illustrates a sectional view of a hood attachment according to a number of variations.

FIG. 89 illustrates a partial sectional view of an airbag module housing.

FIG. 90 illustrates a partial sectional view of an airbag module housing.

FIG. 91 illustrates a partial sectional view of an airbag module housing.

FIG. 92 illustrates a grommet according to a number of variations.

FIG. 93 illustrates a close up of a module housing and section view of a grommet according to a number of variations.

FIG. 94 illustrates a close up of a deployment door on a module housing according to a number of variations.

DETAILED DESCRIPTION OF ILLUSTRATIVE VARIATIONS

The following description of the variations within the scope of the invention is merely illustrative in nature and is in no way intended to limit the scope of the invention, its application, or uses.

A pedestrian protection airbag module 81, may be located in at least one fender region 1 of a vehicle 13. The pedestrian protection airbag module 81, may be configured in any of a number of variations so that when deployed, it may protect or lessen an injury to a pedestrian who may impact the frontal region 15 of the outside of the vehicle 13.

Figure 1:
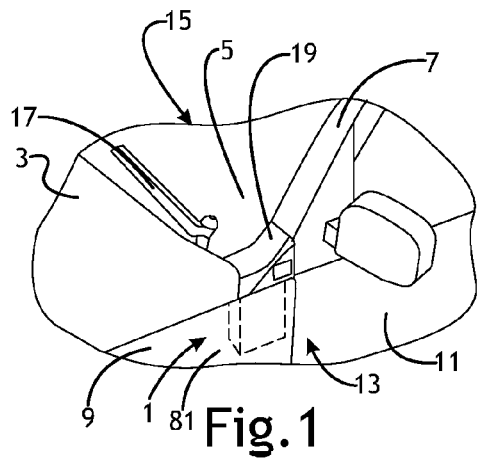
FIG. 1 illustrates a view of a location of an airbag module according to a number of variations.
Figure 2:
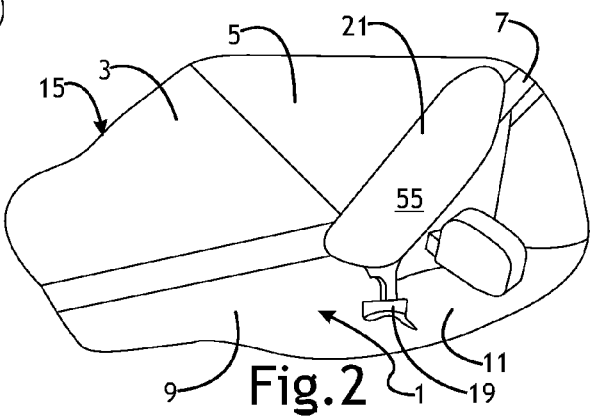
FIG. 2 illustrates a cushion design according to a number of variations.
Figure 3:
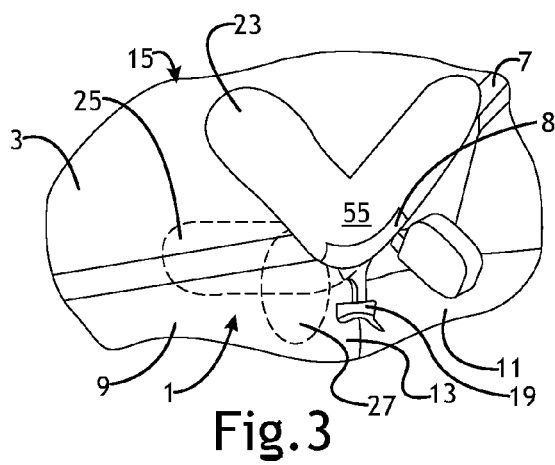
FIG. 3 illustrates a cushion design according to a number of variations.

Referring to FIGS. 1-3, in a number of variations, a pedestrian protection airbag module 81 may be located in the fender region 1 laterally adjacent and below a vehicle's hood 3 and forward of a vehicle side door 11, a variation of which is illustrated in FIG. 1. The pedestrian protection airbag module 81 may be attached to the vehicle structure 13 inside the fender region 1. The pedestrian protection airbag module 81 may also have an attachment device or an integral metal connection which mates the vehicle 13 and the pedestrian protection airbag module 81 together and which may ground (electrically bond) an airbag module 81 inflator 129 to the vehicle body 13.

In a number of variations, the pedestrian protection airbag module 81 may have a deployment door 19 which may be a separate piece on the module 81 or a separate piece adjacent the module 81 which may be visible after installation, a variation of which is illustrated in FIG. 1. The pedestrian protection airbag module 81 may have a housing (a variation of which is illustrated in FIG. 26). In a number of variations, the housing may be constructed and arranged to prevent water intrusion while the pedestrian protection airbag is in an undeployed state. The module housing 143, may comprise a single unitary piece or may include several pieces which may include angled or curved surfaces and may include optional ribs to form a surface like a ramp to guide and/or direct the cushion 55 to deploy away from adjacent components. Likewise, adjacent components may have similar surfaces included that may be integral to them or separate parts to guide and/or direct the cushion 55 away from them during deployment. The pedestrian protection airbag housing may comprise any of a number of materials including, but not limited to plastic, rubber, and/or metal.

In a number of variations, a pedestrian protection airbag module 81 may deploy above the hood 3 without the hood 3 lifting. A pedestrian protection airbag module 81 may include at least one flap 8, a variation of which is illustrated in FIG. 3, which may be located external to the airbag module 81 which may protect the airbag cushion assembly 55 from any of a number of vehicle components based on where it is positioned, including, but not limited to, the fender 9, an A-pillar 7, the hood 3, a windshield wiper 17, a hood hinge mechanism, a deployment door 19, a wiring harness, a side door, or any localized body attachments or trim.

The pedestrian protection airbag 81 may be configured to provide coverage over the frontal region of the vehicle 15 including, but not limited to, a portion of the hood 3, one of the lower and outer windshield 5, an A-pillar 7, or a fender 9 when the airbag module 81 may be deployed. In one variation, a pedestrian protection airbag cushion assembly 55 may have a general "I" shape or single lobe design 21, a variation of which is illustrated in FIG. 2, which may deploy along the A-pillar 7. In another variation, the pedestrian protection airbag cushion assembly 55 may have a general "L" shape 23, a variation of which is illustrated in FIG. 3, which may deploy along the A-pillar 7, the rearward region of the hood 3, and the lower windshield 5. The "L" shaped cushion assembly 55 may also be optionally oriented to deploy along the rearward region of the hood 3, the lower windshield 5 and the outboard region of the hood 3 (not illustrated.) In another variation, the pedestrian protection airbag cushion assembly 55 may have a general "T" shape with cushion portions 25, 27, added to cushion shape 23, a variation of which is illustrated in FIG. 3. In one variation, a "T" shaped cushion 25 may be configured to deploy along the A-pillar 7, the rearward region of the hood 3, the lower windshield 5, the outboard region of the hood 3, and/or the outboard region of the fender 9. In another variation, a "T" shaped cushion 27 may also be configured to completely or partially deploy along the side of the vehicle 13 which may protect a pedestrian from contacting the surface through which the pedestrian protection airbag 81 deployed as well as to deploy along the A-pillar 7, the rearward region of the hood 3, the lower windshield 5, the outboard region of the hood 3, and the outboard region of the fender 9. The forward lobes of the T-shaped cushion assembly, 25, 27 may be combined to provide coverage of the outboard region of the hood, outboard top region of the fender, and/or the outboard side region of the fender. In another variation, a cushion with the single lobe 21 which covers the A-pillar 7 and outer windshield 9 may have cushion portions 25, 27 added to it to produce a cushion that also covers the outboard region of the hood 3 and fender 9. Any of the individual lobes for any of the possible cushion coverage options may be elongated and tubular in shape, more rounded and spherical in shape, or a hybrid shape that is a combination of both with different regions having a different shape. In addition, each of the lobes of the design may be a different shape.

Figure 4:
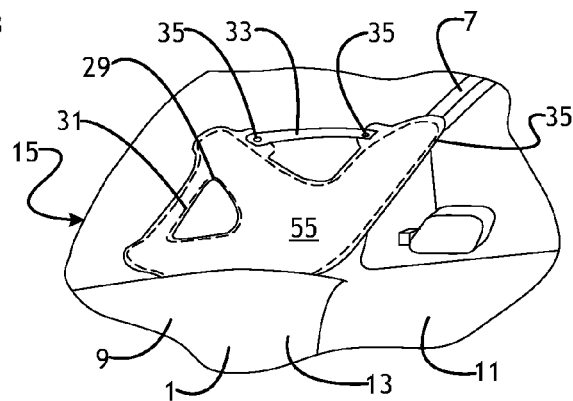
FIG. 4 illustrates a cushion design according to a number of variations.
Figure 5:
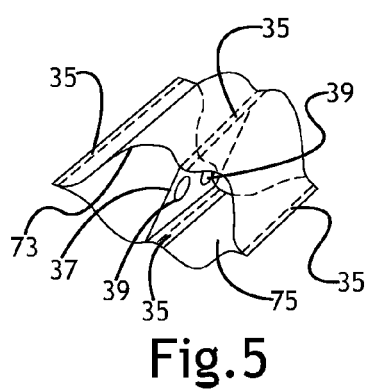
FIG. 5 illustrates an internal tether according to a number of variations.
Figure 6:
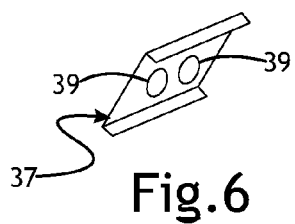
FIG. 6 illustrates an internal tether according to a number of variations.

Referring to FIGS. 4-6, in a number of variations, a pedestrian protection airbag 29 may include one or more cushion stabilizers which may include at least one inflated tubular lobe 31, inflated spherical lobe (not illustrated), or tether 33. An inflated tubular lobe 31 may be integrated into the pedestrian protection airbag assembly 55, a variation of which is illustrated in FIG. 4.

In a number of variations, an integral or separate tether 33 may be part of the airbag cushion assembly 55. The separate tether 33 option may be attached to the airbag cushion assembly 55 in any of a number of variations, including, but not limited to, stitching 35 the tether 33 between two lobes of the cushion assembly 55, a variation of which is illustrated in FIG. 4.

Referring to FIGS. 5 and 6, in a number of variations, a pedestrian protection airbag may include at least one internal tether 37. The internal tether 37 may be located in any location inside the pedestrian protection airbag cushion 55. The internal tether 37 may be attached to a first internal surface of the cushion 73 and a second internal surface of the cushion 75 in any of a number of variations including, but not limited to, stitching 35 the pieces together. The internal tether 37 may also include one or more cut outs 39 in any of a variety of shapes including, but not limited to circles. The internal tether 37 may also have different cross-sections and lengths along the cushion in different regions to provide different deployed cushion shapes along the length of the cushion assembly 55 and two or more internal tethers 37 may be located side by side if necessary to provide different deployed shapes across the width of the cushion assembly 55.

Referring to FIGS. 7-14, in a number of variations, a pedestrian protection airbag module 81 may include tethering which may attach to the vehicle body 13 in order to stabilize the cushion during deployment. Referring to FIGS. 53, and 92-94, in a number of variations, a module housing 143 may include a slot 468 or opening 466 which may extend a distance downward from the top of a lower module housing 243, variations of which are illustrated in FIGS. 53 and 93. In another variation, the slot 468 or opening may be in an upper module housing 296. In another variation, a deployment door 19 of the module housing 243 may include a slot 468 which may extend upward from the bottom of the deployment door 19 and may terminate at a tear seam 271 in the deployment door 19, a variation of which is illustrated in FIG. 94. In another variation, an opening 466 may extend from the tear seam 271 downward a distance through the deployment door 19, a variation of which is also illustrated in FIG. 94. The slots 468 and/or openings 466 may allow a tether 43, rigid tether 83, tether or rod 291, or any type of tether to extend through and/or move within the slot 468 and/or openings 466. Any of the slots 468 or openings 466 in the deployment door 19 and/or the bottom module housing 243 may also include an optional gasket/grommet 464 which may extend around at least a portion of the slot 468 or opening 466 (a section view of a variation of a grommet/gasket 464 in a slot 468 is illustrated in FIG. 93), and may provide a form of water/fluid management by allowing water/fluid to flow against the bottom module housing 243 and/or the deployment door 19 with the optional grommet/gasket 464 limiting or preventing water from passing through the slot 468 or opening 466. The grommet/gasket 464 may also include a cut or a tear seam 470 which may be torn or opened which may enable the tether 43, rigid tether 83, tether or rod 291, or any other type of tether or rod to slip out from it during deployment. In a variation where a tear seam is used, the tether and end of tether may be routed through the hole 472 in the gasket/grommet 464 during assembly, a variation of which is illustrated in FIG. 93. In a variation where a cut is used, the tether may be routed through the cut during assembly. In a number of variations, the gasket/grommet 464 and slot 468 or opening 466 may abut an edge of the module housing 143 or abut to a tear seam so that the tether may escape both the gasket/grommet 464 and the module housing 143 upon deployment. Additional gasket/grommet 464 geometries beyond that illustrated in the figures may be possible. In addition, it may be possible that the gasket/grommet 464 attachment to the mating slot 468 or opening 466 be done with a gasket/grommet 464 geometry, slot 468 geometry or opening 466 geometry that enables the gasket/grommet 464 to separate from the slot 468 or opening 466 during deployment so that it may remain on the tether 43, rigid tether 83, tether or rod 291, or any other type of tether or rod during deployment and the tether 43, rigid tether 83, tether or rod 291 may slip out of the slot 468 or opening 466 during deployment.

Figure 66:
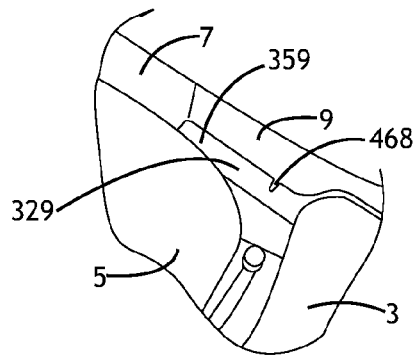
FIG. 66 illustrates a close up of a fender region of a vehicle according to a number of variations.
Figure 74:
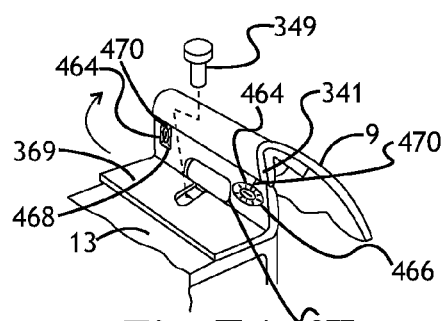
FIG. 74 illustrates a close up of a fender region of a vehicle according to a number of variations.

Referring to FIGS. 66, 74, and 92, in a number of variations, one or more trim pieces 359, 369 may include a slot 468 and/or an opening 466. The slot 468 and/or opening 466 may extend a distance through the trim piece 359, 369 which may allow a tether 43, rigid tether 83, tether or rod 291, or any other tether or rod to slip out from it during deployment, variations of which are illustrated in FIGS. 66 and 74. Any of the slots 468 or openings 466 in the trim pieces 359, 369 may also include an optional gasket/grommet 464 which may extend around at least a portion of the slot 468 or opening 466, variations of which are illustrated in FIG. 74, and may provide a form of water/fluid management by allowing water/fluid to flow against the bottom module housing 243 and/or the deployment door 19. The grommet/gasket 464 may also include a cut or a tear seam 470 which may be torn or opened which may which may enable the tether 43, rigid tether 83, tether or rod 291, or any other type of tether or rod to slip out from it during deployment. In a variation where a tear seam is used, the tether and end of tether may be routed through the hole 472 in the gasket/grommet 464 during assembly. In a variation where a cut is used, the tether may be routed through the cut during assembly. In a number of variations, the gasket/grommet 464 and slot 468 or opening 466 may abut an edge of the trim piece 359, 369 or abut to a tear seam so that the tether may escape both the gasket/grommet 464 and the trim piece 359, 369 upon deployment. Additional gasket/grommet 464 geometries beyond that illustrated in the figures may be possible.

In a number of variations, the tether 43, rigid tether 83, tether or rod 291, or any other type of tether or rod may include a loop component 480, variations of which are illustrated in FIGS. 53 and 93, which may be located outside of and adjacent to the module housing 143. The tether 43 may then be routed so that the loop may be located lower than the slot 468 and/or opening 466 in the module housing 143 which may cause any water/fluid which may contact the tether 43, rigid tether 83, tether or rod 291, or any other type of tether or rod to flow to the loop and drip off the loop which may reduce or eliminate the potential for water to enter into the module housing 143. Likewise a similar loop 480 can be positioned adjacent a deployment door 19 or adjacent trim piece 359, 369 to form a similar function to reduce the potential for water to pass through one of those parts.

A pedestrian protection airbag cushion assembly 55 may include a top cushion panel 41, a bottom rearward cushion panel 49, a bottom forward cushion panel 51, a tether 43, and an anchor 45. The tether 43 may be attached to the anchor 45 in any of a number of variations, including, but not limited to, looping the tether 43 through a passageway in the anchor 45 and stitching 35 the tether 43 to itself closing the loop. The bottom cushion panel assembly 53 may comprise a bottom rearward cushion panel 49 and a bottom forward cushion panel 51 which may each be configured to create a sleeve 57 which may accept a tether 43, a variation of which is illustrated in FIGS. 9-10. The sleeve 57 may be full length, a variation of which is illustrated in FIGS. 11-12, or the sleeve may be a shorter sleeve located at the end of the cushion assembly 55 (not illustrated) with the tether 43 attached to the cushion outside the sleeve (not illustrated) such as in a location in close proximity or directly to the neck 48. The tether assembly 47 may be placed between the bottom rearward cushion panel 49 and the bottom forward cushion panel 51, a variation of which is illustrated in FIG. 11. The tether assembly 47 may then be attached to the bottom rearward cushion panel 49 and the bottom forward cushion panel 51 in any of a number of variations, including, but not limited to, stitching 35 the tether assembly 47 to the bottom cushion panel assembly 53.

The bottom rearward cushion panel 49 may be attached to the bottom forward cushion panel 51 in any of a number of variations including, but not limited to, stitching 35 the bottom rearward cushion panel 49 to the bottom forward cushion panel 51, to create a bottom cushion panel assembly 53. The joining of a rearward cushion panel 49 and a bottom forward cushion panel 51 may create a neck 48 through which an inflator may be inserted into the cushion assembly 55 and clamped into place. The top cushion panel 41 may then be attached to the bottom cushion panel assembly 53 in a number of variations including, but not limited to, stitching 35 the top cushion panel 41 to the bottom cushion panel assembly 53 to create the pedestrian protection cushion assembly 55. In one variation, the pedestrian protection cushion panels 49, 51, 53 may be sealed at the sew seams with silicone. In another variation, the cushion assembly 55 may be one piece woven. During deployment, the tether 43 located in the sleeve 57 may help control a portion of the cushion's trajectory as the sleeve moves along the tether 43. In another variation, a cushion assembly 55 may include a "T" shape 89 and may include two sleeves 59, 61 which may each house a tether assembly 63, 65, a variation of which is illustrated in FIG. 14. In one variation, the first sleeve 59 may be approximately perpendicular to the second sleeve 61. It should be appreciated that numerous variations and orientations of the panels and the sleeves are possible and are not limited to those described herein.

The cushion assembly 55 may include tear away stitches sewn through it in at least one selected region to assist with the fold or to help control the cushion trajectory during deployment. The cushion assembly 55 may also include one or more vent holes in it.

Referring to FIG. 13, in a number of variations, the inboard lobe 67 of a cushion assembly 55 may include a feature to make the cushion assembly 55 thinner so that the cushion panels 41, 53 may overlap without displacing one another. The feature may include, but is not limited to, stitching 35 a straight line starting at any of the available edges of the inboard lobe 67 and stitching 35 a circle 62 by itself or optionally at the end of the straight line, a variation of which is illustrated in FIG. 13. The feature may also include a dog bone shaped sew near the end of the cushion assembly 55 where the middle sewn portion between the wider ends may be straight or curved, and may include an associated material cutout (not illustrated). If an internal tether 37 is used, a variation of which is illustrated in FIGS. 5-6, it may be tapered to a point or a reduced size section.

Referring to FIGS. 15-16, in a number of variations, a pedestrian protection airbag module 81 may have a flexible tether 69. The flexible tether 69 may include any number of materials including, but not limited to, a woven fabric. The flexible tether 69 may be attached to the cushion assembly 55 in a number of variations including, but not limited to, stitching 35 the flexible tether 69 to the cushion assembly 55 or it may be incorporated into the end of the cushion assembly 55.

In one variation, a flexible tether 69 may be attached to the vehicle body 13 rearward of the hood hinge (not illustrated) and forward of the windshield wiper 17 with the use of an anchor 71, a variation of which is illustrated in FIG. 15. The flexible tether 69 may be the tether assembly 47 attached to the cushion assembly 55 or a separate tether not attached to the cushion assembly 55. In another variation, the flexible tether 69 may be attached to the vehicle body 13 fore-aft below the show surface and parallel to the fender 9 and the hood interface. In yet another variation, the flexible tether 69 may be attached to the A-pillar structure with a cover over it that may form part of the A-pillar surface (not illustrated) that may split or move to the side during airbag deployment which may allow the cushion assembly 55 to move along the tether 69. In another variation, the flexible tether 69 may extend through a passage in a discrete deployment door 19, other trim piece, and housing 296. The end of the flexible tether 69 may exit through the passage and may be attached to the vehicle structure 13. The anchor 71 may be attached to the vehicle 13 in any of a number of variations including, but not limited to, a bolt and a clip.

In another variation, the flexible tether 69 may be attached to the vehicle body 13 underneath the hood edge 79 or fender edge 341 with the use of an anchor 71, a variation of which is illustrated in FIG. 16. In yet another variation not illustrated, the flexible tether may extend up the A-pillar, may attach to the A-pillar and/or roof structure and be covered by an A-Pillar trim piece. The flexible tether 69 may comprise any number of materials including, but not limited to, a woven fabric. A frangible attachment 77 may also be used to secure the tether 69 which may allow the tether 69 to break free during airbag deployment, a variation of which is illustrated in FIG. 15.

Figure 17:
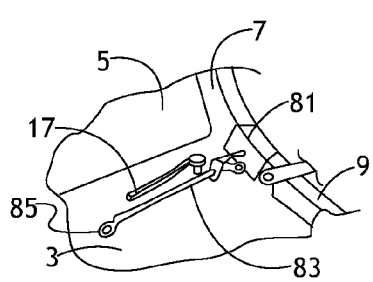
FIG. 17 illustrates a rod or tether assembly attached to a vehicle structure according to a number of variations.
Figure 18:
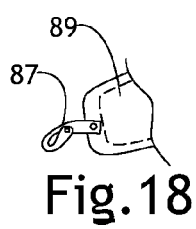
FIG. 18 illustrates a close up of the cushion assembly according to a number of variations.

Referring to FIGS. 17-18, in a number of variations, a pedestrian protection airbag module 81 may include a rod or rigid tether 83. The rigid tether 83 may include any number of materials including, but not limited to metal and aluminum. In one variation, the rigid tether 83 may be attached to the vehicle body 13 rearward of the hood hinge and forward of the windshield wiper 17, a variation of which is illustrated in FIG. 17. In another variation, the rigid tether 83 may be located fore-aft between the fender 9 and the hood hinge (not illustrated).

In yet another variation, the rigid tether 83 may be attached to the A-pillar structure with a cover over it that may form part of the A-pillar surface (not illustrated) that may split or move to the side during airbag deployment which may allow the cushion assembly 55 to move along the rigid tether 83. The rigid tether 83 may have an attachment feature 85 at its end which may be attached to the vehicle body 13 in any of a number of variations including, but not limited to, the use of a bolt or a curved end that is routed through a hole in the body 13. Depending on orientation and location, rigid tether 83 may also have a curve to route around the hood hinge and the windshield wiper 17 depending on the hinge type of the vehicle.

The rigid tether 83 and the flexible tether 69 if separate from the cushion assembly 55 may attach to the cushion assembly 55 in any number of variations, including, but not limited to, creating a flexible attachment loop 87 which may be configured to receive the rigid tether 83 or flexible tether 69, a variation of which is illustrated in FIG. 18. The attachment loop 87 may be a separate piece or may be integral to the parent material of the airbag cushion (not illustrated). During deployment, the flexible attachment 87 may move along the rigid tether 83 or flexible tether 69 during deployment. The rigid tether 83 may be attached rearward of the hood hinge and forward of the windshield wiper 17, a variation of which is illustrated in FIG. 15. In another variation, the rigid tether 83 may be attached to the vehicle body 13 fore-aft below the show surface and parallel to the fender 9 and the hood interface. In another variation, the rigid tether 83 may extend through a passage in a discrete deployment door 19, other trim piece, and/or housing 296. The end of the rigid tether 83 may exit through the passage and may be attached to the vehicle structure 13. The rigid tether 83 may be attached to the vehicle 13 in any of a number of variations including, but not limited to, a bolt, a clip, or a curved end that is routed through a hole in the vehicle.

Figure 19:
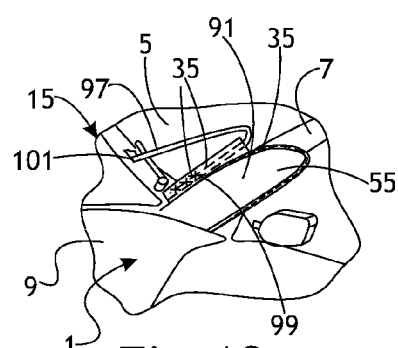
FIG. 19 illustrates an inflated airbag according to a number of variations.
Figure 20:
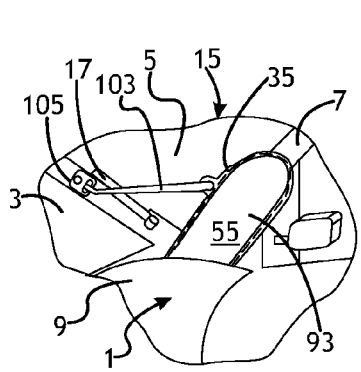
FIG. 20 illustrates an inflated airbag according to a number of variations.
Figure 21:
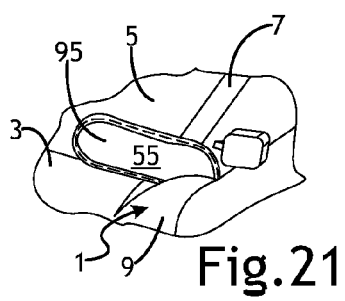
FIG. 21 illustrates an inflated airbag according to a number of variations.
Figure 22:
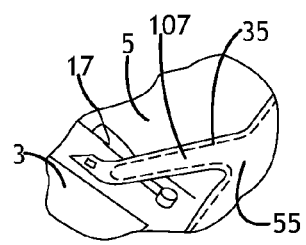
FIG. 22 illustrates a close up of a cushion assembly tether according to a number of variations.

Referring to FIGS. 19-22, in a number of variations, a pedestrian protection airbag 81 may include a cushion assembly 55 having an "I" shaped or single lobe 91, 93, 95. In one variation, a tether assembly 97 may be attached to the "I" shaped cushion assembly 91 and may be at one end partially housed and attached with stitching 35 or other mechanical attachment inside of a sleeve 99 incorporated into the "I" shaped cushion assembly 91 and at the other end attached to the vehicle 13 through the use of an anchor 101, a variation of which is illustrated in FIG. 19. In another variation, a fixed length tether 103 may be attached to the "I" shaped cushion assembly 93 and attached to the vehicle body 13 through the use of an anchor 105, a variation of which is illustrated in FIG. 20. In another variation, an inflatable tube 107 may be incorporated into the cushion assembly 55 which may attach to the vehicle body 13 either directly or via an intermediate piece, a variation of which is illustrated in FIG. 22. When inflated, the "I" shaped cushion assembly 91, 93, 95 may extend across the A-pillar 7, a variation of which is illustrated in FIGS. 19-20, may extend across the lower windshield 5 and hood 3, a variation of which is illustrated in FIG. 21, or may extend down the side of the fender and hood 3 a variation of which is illustrated with lobe 25 in FIG. 3. Any variety of cushion configurations, such as an "L-shaped" cushion assembly and/or a "T-shaped" cushion assembly may also use similar approaches for achieving a local attachment.

Figure 23:
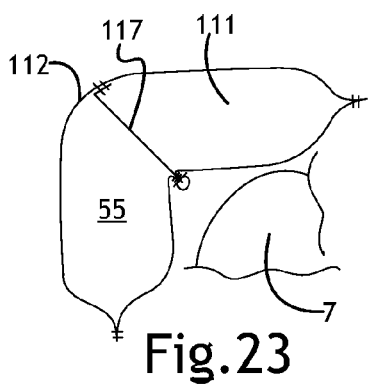
FIG. 23 illustrates a cushion assembly according to a number of variations.
Figure 24:
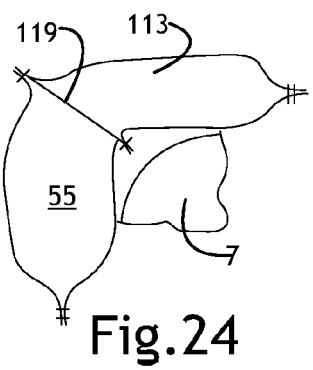
FIG. 24 illustrates a cushion assembly according to a number of variations.
Figure 25:
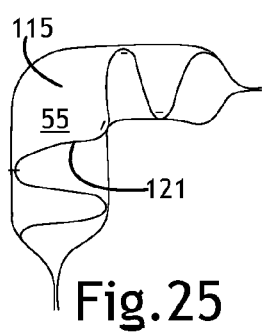
FIG. 25 illustrates a cushion assembly according to a number of variations.

Referring to FIGS. 23-25, in a number of variations, a pedestrian protection airbag 81 may include an "L" shaped cushion assembly cross-section 111, 113, 115. At least one internal tether 117 may be incorporated into the cushion assembly 55 to maintain the cushion shape. In one variation, an internal cross-tether element 117 may be incorporated on tan L-shaped cushion assembly 111 at the location of the bend 112 and sewn to the internal walls of the cushion assembly 111, a variation of which is illustrated in FIG. 23. In another variation, an internal cross-tether 119 element may be incorporated into the cushion assembly 113 at the location of the bend and sewn into a joint between cushion pieces, a variation of which is illustrated in FIG. 24. In another variation, cross-tethers 121 may be incorporated into a one piece woven cushion assembly having an "L" shape 115, a variation of which is illustrated in FIG. 25. The cross tethers 121 may include stitching that may extend back and forth from loops or fixed attachments formed in a first side and a second side of the "L" shaped cushion assembly 115. The "L" shaped cushion assembly cross-sections 111, 113, 115 may then be configured to glove or nest against the A-pillar 7 or some other exterior surface of the vehicle such as the fender (not illustrated). It may also be configured to nest against the rearward edge of a deployed hood, as illustrated in FIG. 48. Finally, the "L" shaped cushion assembly cross-sections 111, 113, 114 may also be configured to rest against a generally flat surface profile to raise the bent portion of the cushion away from the generally flat surface to provide additional space for energy absorption during pedestrian loading in a pedestrian impact.

A pedestrian protection airbag module 81 may include an inflator 129 which may be used to inflate the cushion assembly 55 during deployment. The inflator 129 may be attached to the cushion assembly 55 in any of a number of variations including, but not limited to, at least one clamp 323 that attaches to the cushion's neck 48, a variation of which is illustrated in FIGS. 26 and 27.

In a number of variations, a pedestrian protection airbag module 81 may be attached to the fender region 1 of a vehicle 13 and when deployed, the pedestrian protection airbag module 81 may push the hood 3 upward. In one variation, a portion of the cushion assembly 55 may deploy underneath the hood 3 and a portion of the cushion assembly 55 may deploy above and beside the raised hood 3. In another variation, the cushion assembly 55 may completely deploy above and beside the raised hood.

Referring to FIGS. 26-28, in a number of variations, an inflator assembly 233 129 may be located in the pedestrian protection airbag module 81 partially underneath the fender 9 and partially underneath the hood 3 of a vehicle 13. The inflator assembly 233 may include an inflator 129 and at least one clamping feature including, but not limited to, a clamp 142 which may surround a portion of the inflator 129 and may hold the inflator 129 in place.

In a number of variations, when the pedestrian protection airbag module 81 deploys, the inflator 129 may deploy in a way which may raise the hood 3. The clamps 142 that surround the inflator 129 may each include a stud 162 which may interface with a hole in the module housing 143 and/or a mounting bracket 460. The inflator 129 may route through the clamps 142 and may be temporarily attached in its undeployed position via clamp load, a frangible feature (not illustrated), or an element of the design that may prevent the inflator 129 from moving downward with respect to the clamps 142, such as a ridge around the inflator body 130 just above a clamp (not illustrated). The inflator 129 may be slideable with respect to the clamps 142 with the forces generated by deployment when deployment occurs. Upon deployment, gas may be dispelled from the bottom 141 of the inflator 129 causing the inflator 129 to push at least partially up past the pedestrian protection airbag module housing 143 so that it may make contact with the hood 3.

In one variation, the cushion assembly 55 may be compressed/sandwiched between the inflator 129 and the hood assembly 3 when the hood 3 is lifted (not illustrated). In another variation, the cushion 55 may not be compressed between the inflator 129 and the hood assembly 3 when the hood 3 is lifted, a variation of which is illustrated in FIGS. 26-27. In this variation, a plug 140 may be broken out of the airbag module housing 143. As the inflator 129 pushes against the hood 3, a temporary hood attachment 125 may be broken 127 allowing the hood 3 to lift up. Simultaneously with the inflator 129 movement, the cushion 55 may also fill and deploy. As the cushion assembly 55 fills, it may push out one or more flaps 131 of module housing material that may act as a cushion protector from objects such as the hood 3. The cushion assembly 55 may also push the fender 9 or deployment door 19 out of the way and may continue to fill until it achieves its final position, a variation of which is illustrated in FIGS. 2-4, 19-21, 47, 60 and 62.

An airbag module 81 with a moveable inflator 129 may be mounted outboard of a hood hinge mechanism 169, as part of one or more pedestrian protection airbag modules 81 located in the fender regions 1 of a vehicle 13. The airbag module 81 with the slideable inflator 129 may alternatively be mounted inboard of the hood hinge mechanism 169 and may push up on the hood 3 at a location between a left and right hood hinge mechanism 169. In yet another alternative, the moving inflator 129 may also simultaneously push up on a portion of the fender 9, a portion of the A-pillar 7, and/or a portion of an adjacent trim piece that may cover a gap between adjacent components in the region of the inflator 129 (none of these illustrated).

In any of a number of variations, the hood hinge 259 may be configured to enable an upward force to detach, or partially detach, a hood 3 for which an inflator power source concept applies without limitation. During deployment, the inflator 129 may raise and may cause the inflator 129 to reach a travel stop which may limit the inflator's 129 upward motion. In one variation, a lower clamp 142 may be contacted by a ridge 144 around the inflator 129. The interference may be configured so that the parts 142, 144 may optionally wedge together so that the inflator 129 may remain affixed in a raised position and may be prevented from reverse travel if loaded from the top by a pedestrian impact event. Additional forms of mechanical travel stops and anti-reverse travel features may be incorporated. A coupler 153, may be attached to the top 137 of the inflator 129 which may contact and abut against the hood 3, fender 9, A-Pillar 7 or deployment door 19 when the inflator 129 deploys and lifts, a variation of which is illustrated in FIG. 28. The coupler 153 may provide better geometric alignment and may lift an adjacent component to the hood 3 along with the hood 3.

Referring to FIGS. 29-35, in a number of variations, an inflator 129 may be located in the pedestrian protection airbag module 81 under a fender 9 and beside the hood 3 of a vehicle 13. When the inflator 129 deploys, the inflator 129 may dispel gas from the bottom 141 of the inflator 129 causing the inflator 129 to push upwards which may cause the inflator 129 to contact a hood hinge mechanism 169 which may partially or fully detach, deform, or otherwise allow the hood 3 to lift upwards, a variation of which is illustrated in FIG. 33. In one variation, the inflator 129 may be attached to two studs 162 that may be either integral to the inflator body 130 or may be mounted on one or more clamps 142 that in turn may be rigidly affixed to the inflator body 130, for example with one or more crimps. In a number of variations, the inflator 129 may be attached/mounted to a mounting bracket 460. In one variation, the studs 162 on the inflator 129 and/or on the one or more clamps 142 may extend through one or more slots 162 on the mounting bracket 460 and/or the module housing 143, an illustrative variation of which is illustrated in FIGS. 32 and 33. The studs 162 may be slideably mounted in the one or more slots 163 in the module bracket 460 and/or the module housing 143. The mounting bracket 460 may then attach the airbag module 81 to the vehicle 13. While the mounting bracket 460 and the module housing 143 are typically separate parts, it may be possible with some designs to combine these parts. Gravity, clamp load, the bottom of the slot, and potentially a frangible feature (not illustrated) may hold the inflator 129 in the undeployed position prior to deployment. Upon deployment the inflator gases may propel the inflator 129 upward as the studs 162 slide upward in one or more slots 163. The inflator 129 may then contact the hood hinge mechanism 169 to cause its detachment. When this occurs, an adjacent trim piece 170 may deform and move out of the way if contacted by the hood hinge mechanism 169 which may allow a portion of the hood hinge mechanism 169 and the hood 3 to lift.

In another alternative, the moving inflator 129 may also simultaneously push up on a portion of the fender 9, a portion of the A-pillar 7, or a portion of an adjacent trim piece that may cover a gap between adjacent components in the region of the inflator 129 (none of these illustrated). As the inflator 129 strokes upward, a plug 140 may be broken out of the module housing 143 and may rise with the inflator 129. A triangular point 149 may be incorporated into the module housing 143 which may act as a wedge against the upper inflator stud 162 which may act as a travel stop and may prevent the inflator 129 from projecting a length out of the module 81 further than desired. The triangular point 149 may also act as a wedge to lock the inflator stud 162 to it and thus may function as an anti-reverse travel feature.

In a number of variations, the cushion 133 may fill with gas and inflate simultaneously with the inflator 129 movement. The cushion assembly 55 may push a fender 9, a fender 9 along with a separate deployment door, or a deployment door 19 out of its path and may continue to fill until it achieves its final position, a variation of which is illustrated in FIGS. 2-4, 19-21, 47, 60, and 62. The module housing 143 may include a protective flap attachment 151 which may prevent or lessen contact between the inflating cushion assembly 55 and the hood hinge mechanism 169, a variation of which is illustrated in FIG. 33 and/or potentially the hood 3 or other adjacent components (not illustrated). The hood hinge mechanism 169 may contain an open slot 165 in the lower portion 173 of the hood hinge mechanism 169 which may allow the upper portion 171 of the hood hinge mechanism 169 to raise upwards as the inflator 129 deploys and pushes upward. The upper portion 171 of the hood mechanism 169 may have a U-shape which may stabilize the lateral bolt 155 or other protruding structure. In another variation, a hood hinge mechanism 169 may also include a link arm (not illustrated) in its configuration that may bend or move to enable the hood raising. In a number of variations, other portions of the hood mechanism may be extended to be under the airbag module where they may be contacted and moved during deployment and other means of releasing the hood may be possible.

The inflator 129 may also be directly attached or abut to a portion the hood hinge mechanism 169 via a coupler 153, a variation of which is illustrated in FIG. 34. The coupler 153 may also directly attach or abut against separately or in addition to one of the following to help lift it during deployment: on a portion of the fender 9, a portion of the A-pillar 7, or a portion of an adjacent trim piece that may cover a gap between adjacent components in the region of the inflator (none of these illustrated). The module housing 143 may be attached to the vehicle body 13 using at least one fore-aft attachment 157, a variation of which is illustrated in FIG. 30, or at least one lateral attachment 159, a variation of which is illustrated in FIG. 31. The fore-aft attachment 157 or the lateral attachment 159 may be attached to the vehicle body 13 in any of a number of variations including, but not limited to, a bolt, a clip, and/or a bent tab going through a receiving hole. An airbag module 81 having a slideable inflator 129 may also be mounted at a location inboard of the hood hinge mechanism 169 and may push up on the hood 3 at a location between the left and right hood hinge mechanisms 169.

Referring to FIG. 89, in a number of variations, a module housing 143 may contain a slot 170 that may surround a wedge housing 172 that in turn surrounds an upper inflator stud 162. The wedge housing 172 may contain a wedge dowel 174 which may interact and wedge against both the angled wedge wall 178 of the wedge housing 172 and the module housing 143 once the inflator has reached full stroke. This configuration may act as an anti-reverse travel feature. The slot 170 may also be configured to include a weakened wall that may contain a deformable energy absorbing surface 176. In this variation, if the hood 3 is loaded from the top, the inflator 129 and hood 3 may stroke downward in a controlled manner as the deformable energy absorbing surface 176 deforms. Other forms of wedging devices, such as other configurations used in seatbelt pretensioners may be applied to this concept.

Referring to FIG. 90, in another variation, the module housing 143 may contain a slot 180 that may surround an upper inflator stud 162. The slot 180 may include a second slot 182 which may be constructed and arranged to accommodate a flexible element 184. The second slot 182 may be placed at an angle. The flexible element 184 may comprise any of a variety of materials including, but not limited to, spring steel. As the upper inflator stud 162 moves upward, the flexible element 184 may flex which may allow the inflator stud 162 to pass by. If the hood 3 is pushed down and the inflator stud 162 attempts to reverse travel, the flexible element 184 may engage the inflator stud 162 and may act as an anti-reverse travel feature. The flexible element 186 may include a geometry with curved features 188 that may compress and may interact with the sides of the slot 190, a variation of which is illustrated in FIG. 91, which may allow the flexible element 186 to deform in the slot 190 and absorb energy once the inflator stud 162 has passed by, attempts to reverse travel, and/or engages the top of the flexible element 186.

In another variation, a device may be configured which extrudes a metal strip between ridged members or pulls a bent metal strip through rigid members to accomplish this energy absorption feature (not illustrated). Finally, it is possible for these anti-reverse travel and energy absorption features to be directly integrated into the hood hinge assembly in any of a variety of ways including, but not limited to, placing it in one of the slots a variation of which is illustrated in FIGS. 36-41.

Referring to FIGS. 36-41, in a number of variations, a hood hinge mechanism 181, 193, 207 may be configured so that a) without deployment the hood 3 may rotate about single pivot points on the left and right sides of the hood 3 when it is being opened or closed and b) after deployment of the pedestrian protection airbag 81, the hood 3 may be retained to the vehicle body 13 when in a raised state.

Figure 36:
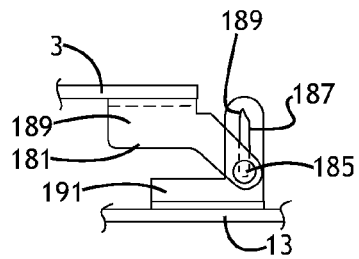
FIG. 36 illustrates a hood hinge structure according to a number of variations.
Figure 37:
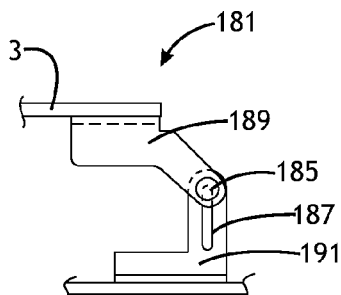
FIG. 37 illustrates a hood hinge structure according to a number of variations.

In one variation, the hood 3 may be rotated about the lower end of a slot 187 when the hood 3 is opened or closed in normal usage and the upper portion 189 of a hood hinge mechanism 181 may be pushed upwards during deployment of the pedestrian protection airbag module 81. The upper portion 189 of the hood hinge mechanism 181 and the lower portion 191 of the hood hinge mechanism 181 may be connected by a bolt 185 which may be seated in a generally vertical slot 187 and may form the pivot for the hood 3 when it may be opened and closed during normal operation, a variation of which is illustrated in FIG. 36. As the pedestrian protection airbag module 81 deploys, the upper portion 189 of the hood hinge mechanism 181 may be pushed upwards along the slot 187 which may raise the hood 3 of the vehicle 13, a variation of which is illustrated in FIG. 37. The closed upper portion of the generally vertical slot 187 may then function as a travel stop. The slot 187 may be configured such that the upper portion 189 of the hood hinge mechanism 181 may remain in a raised state which may cause the hood 3 to remain in a raised state. In one variation, the top of the slot 187 of the hood hinge mechanism 181 may include a tapered wedge feature 189, a variation of which is illustrated in FIG. 36.

Figure 38:
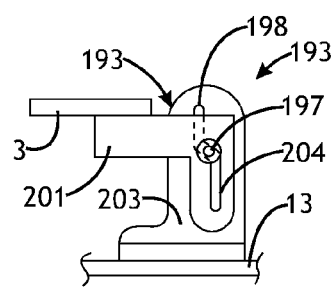
FIG. 38 illustrates a hood hinge structure according to a number of variations.
Figure 39:
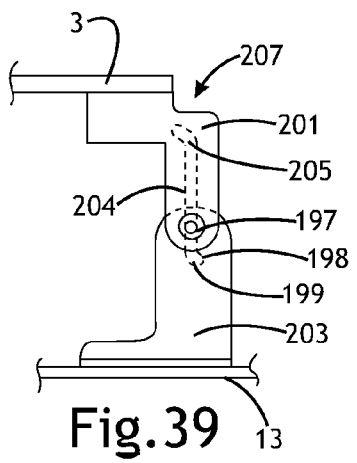
FIG. 39 illustrates a hood hinge structure according to a number of variations.

In another variation, the upper portion 201 of a hood hinge mechanism 207 may be pushed upwards during deployment of the pedestrian protection airbag module 81, a variation of which is illustrated in FIG. 39. The upper portion of the hood hinge mechanism 201 may be connected to the lower portion 203 of the hood hinge mechanism 193 by a bolt 197 which may be seated in two vertical slots 198, 204, a variation of which is illustrated in FIG. 38. The upper end of the vertical slot 204 on the upper portion 201 of the hood hinge mechanism 193 may be tapered forward 205 and the bottom end of the vertical slot 198 on the lower portion 203 of the hood hinge mechanism 193 may be tapered rearward 199 so that the bolt 197, and the tapered slot ends 205, 199 interlock and the hood 3 does not rise as the hood 3 is driven rearward in the case where the airbag module 81 does not deploy during a frontal impact. Also in this variation, a variation of which is illustrated in FIG. 38, the bolt 197 may rest on the top of the vertical slot 204 and the bottom of the slot 198, which may form the pivot point for the hood 3 when it is opened and shut during normal operation. Then, when the hood 3 may be raised via deployment, the bolt 197 may move to the opposite side of both slots 198, 204 which may allow the hood 3 to move up a height that is approximately the length of both slots 198, 204 combined, a variation of which is illustrated in FIG. 39. In a number of variations, the opposite side of both slots 198 and 204 may also be angled to help maintain the hood orientation during loading when the hood 3 has been raised upward during deployment.

In another variation, the slot 199 and the surrounding bracket on the upper portion 201 of the hood mechanism 207 may extend down and adjacent the vehicle body portion to which the lower bracket 203 mounts, which may enable additional hood 3 upper travel. The downward extension may be beside the vehicle body 13 or it may be through a slot in the vehicle body (not illustrated). In either case, the hood 3 and associated upper portion 201 of the hood mechanism 207 may be able to move through their range of rotational travel when the hood mechanism 207 pivots about its pivot that is represented by a bolt 197, a variation of which is illustrated in FIG. 38.

Figure 40:
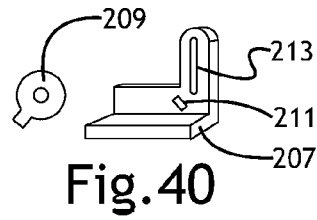
FIG. 40 illustrates a hood hinge structure according to a number of variations.
Figure 41:
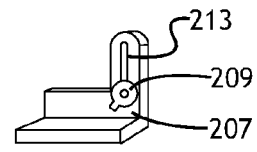
FIG. 41 illustrates a hood hinge structure according to a number of variations.
Figure 42:
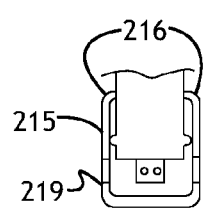
FIG. 42 illustrates a close up sectional view of an inflator nozzle according to a number of variations.

In another variation, the hood hinge mechanism 207 may be configured in a way which may hold the hood 3 in its undeployed state, a variation of which is illustrated in FIGS. 40 and 41. The hood hinge mechanism 207 may have a cutout 211 which may mate with a retention feature 209 that is attached to a bolt which may be seated in a vertical slot 213 which may be located in the hood hinge mechanism 207. When the hood 3 is lifted by a hood lifting device, the retention feature 209 may deform which may allow the bolt 197 to travel in the vertical slot 213.

In another variation, any of the hood hinge assemblies illustrated in FIGS. 36-41 may also be moved to the hood lifted state by one or more separate pyrotechnic devices that may not be part of an airbag module 81 including, but not limited to, one or more dedicated hood lifters.

Figure 44:
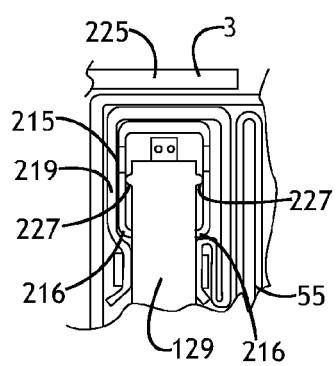
FIG. 44 illustrates a close up sectional view of an inflator nozzle according to a number of variations of the invention.
Figure 45:
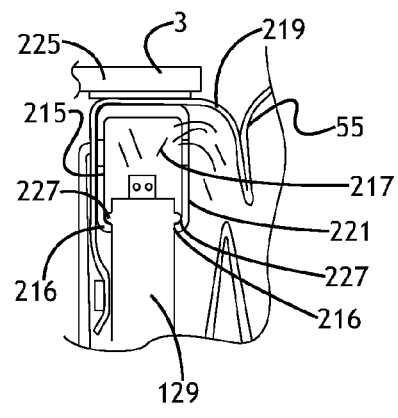
FIG. 45 illustrates a close up sectional view of an inflator nozzle according to a number of variations of the invention.
Figure 43:
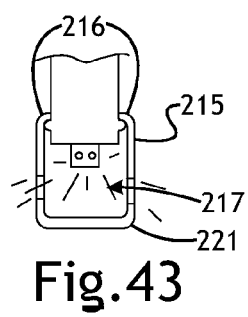
FIG. 43 illustrates a close up sectional view of an inflator nozzle according to a number of variations.

Referring to FIGS. 42-45, in a number of variations, an inflator 129 may include a telescoping nozzle 215. The telescoping nozzle 215 may be located below the hood 3 or hood hinge system 225 a variation of which is illustrated in FIG. 44. When the inflator 129 deploys, gas 217 may be released from the inflator 129 a variation of which is illustrated in FIGS. 43 and 45. This may cause the telescoping nozzle 215 to push against the hood hinge system 225 or directly against the hood 3 which may cause the hood 3 to rise. The inflator 129 may also include a radial protrusion 227 which may act as a stopping feature to catch the bent lip 216 on the telescoping nozzle 215 which may prevent the telescoping nozzle 215 from disconnecting from the inflator 129.

The cushion assembly 55 may include a layer 219 routing between the telescoping nozzle 215 and the hood 3 or hood hinge system 225 and may include at least one additional layer by sewing a sacrificial patch of material (not illustrated) onto the cushion assembly 55. This may protect or lessen the effect that the inflator gases 217 may have on the integrity of the cushion assembly 55. The sacrificial patch may also protect the cushion assembly 55 from contact with objects on the vehicle including, but not limited, to the windshield wipers, hood edge, deployment door edge, and/or the fender edge 341. The telescoping nozzle may be mounted outboard of the hood hinge system 225, as part of one or more pedestrian protection airbag modules 81 located in the fender regions of a vehicle 1. The telescoping nozzle 215 may also be mounted inboard of the hood hinge system 225 and may push up on the hood 3 or the hood hinge system 225 at a location inside or between the left and right hood hinge systems 225.

In another alternative, the telescoping nozzle 215 may also simultaneously push up on a portion of the fender, a portion of the A-pillar, a portion of a deployment door, and/or a portion of an adjacent trim piece that may cover a gap between adjacent components in the region of the inflator (not illustrated). In another variation, the telescoping nozzle 215 may rest against the bottom of the module 81 and surround the lower part of the inflator such as with inflator and module configurations as illustrated in FIGS. 26-27 and FIGS. 32-33. Upon deployment the telescoping nozzle 215 may direct the inflator gas into the cushion 55 in a controlled manner while the inflator rises upward.

Figure 46:
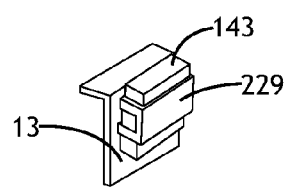
FIG. 46 illustrates a housing configuration according to a number of variations.

Referring to FIG. 46, in a number of variations, the housing 143 may include a structural outer element 229 which may help to direct the trajectory of the cushion assembly 55 during deployment. The structural element 229 may also reduce lateral expansion or bellmouthing of the housing 143 and may comprise any number of materials including, but not limited to, steel or other materials which may not stretch under loading. The structural element 229 may completely surround or ring the housing 143 and function like a band of material. Alternatively, the structural element may be a U-shaped piece that is attached to the vehicle body 13 or a module mounting bracket 460 on the sides of the module 81.

Referring to FIGS. 47-48, in a number of variations, a portion of the cushion assembly 55 may be configured to at least partially deploy from under a portion of a raised hood. The cushion assembly 55 may interact with a portion of the underside of the hood 3 and may at least partially push it up. The hood 3 may have a frangible hood hinge assembly 231 containing an element such as a frangible fastener (not illustrated) which may break or release during deployment of the pedestrian protection airbag assembly 81 which may allow the hood 3 to rise. It may also include a hood linkage that may bend in a manner which may allow the hood to rise. In another variation, a separate pyrotechnic device or multiple devices may deploy to lift the hood 3, and the cushion assembly 55 may be configured to at least partially interact and partially fill on the underside of the hood 3, a variation of which is illustrated in FIG. 47. In yet another variation, the cushion assembly 55 may be configured, such as with a cushion portion like 111, to fill a gap aft of the hood 3 in a raised position, a variation of which is illustrated in FIG. 48.

In another variation, a pedestrian protection airbag module 81 may be mounted in the fender region 1 laterally adjacent and below the hood 3 and forward of the vehicle side door 11 and may deploy through a discrete deployment door 19, which may be mounted adjacent the hood 3 and the fender 9, a variation of which is illustrated in FIG. 1.

Referring to FIGS. 49-54, in a number of variations, a pedestrian protection airbag module 81 may be constructed and arranged to deploy through a discrete deployment door 19 when deployed. The discrete deployment door 19 may include at least one snap feature 247 which may attach to the vehicle 13 in a number of locations including, but not limited to, a fender 9, a body structural member, or the hood 3. The snap features 247 on the discrete deployment door 19 can be either male features, as shown in FIGS. 49-50, or female features (not illustrated). The snap features 247 may also have a weakened region that may be designed to break or separate into pieces when experiencing the forces transmitted to it during deployment. In one variation, if the discrete deployment door 19 snaps into the hood 3, the discrete deployment door 19 may be constructed and arranged to seat against the fender 9 and/or other vehicle body structure so that the discrete deployment door 19 may move with the hood 3 when the hood 3 may open. The discrete deployment door 19 may also include a plurality of attachments around its periphery. The discrete deployment door 19 may be attached to the vehicle 13 in any of a number of variations including, but not limited to, a mechanical fastener. The pedestrian protection airbag module 81 and the discrete deployment door 19 may be assembled into the vehicle 13 in any number of variations including, but not limited to, from above the vehicle 13. The pedestrian protection airbag module 81 may be attached to the vehicle 13 with the use of at least one mechanical fastener. The mechanical fastener may include, but is not limited to, a positioning feature, a snap feature, and/or a threaded fastener. The discrete deployment door 19 may be attached to the vehicle 13 in any of a variety of locations including, but not limited to an A-pillar 7, a trim piece adjacent the hood, a fender, or a vehicle door. In any of the cases described herein, the discrete deployment door 19 may remain attached to one adjacent structure or piece and separate or detach from other adjacent structures or pieces during deployment. The discrete deployment door 19 may also be designed to separate from all adjacent structures or pieces during deployment.

The discrete door 19 may alternately be attached to the pedestrian protection airbag module 81 in any of a variety of ways including, but not limited to a hook 247 and window feature 248, a variation of which is illustrated in FIG. 51 with a window feature 248 on the discrete deployment door 19. The discrete deployment door 19 may be configured to be shingled with surrounding surfaces and attachments which may prevent water from contacting the pedestrian protection airbag module 81. The discrete deployment door 19 may include an attachment feature 237 which may accept a tether assembly 235, a variation of which is illustrated in FIG. 50. In another variation, a tether 235 may be integral to the discrete deployment door 19 and may retain the discrete deployment door 19 to the vehicle body 13 during and after deployment of the airbag module 81 when the end 238 opposite the end secured to the attachment feature 237 is attached to the vehicle 13 or a component attached to the vehicle 13, such as a fender 9 or adjacent trim piece. In this manner, if the discrete deployment door 19 completely or partially detaches from the vehicle 13 during deployment, it may remain retained to the vehicle 13 by the tether 235.

In yet another variation, a tether 235 may be attached to the discrete deployment door 19 using a threaded fastener (not illustrated). The discrete deployment door 19 may also include an emblem 239, a variation of which is illustrated in FIG. 49. The discrete deployment door 19 may include at least one tear seam 249 which may be located on a non-visible surface 250 of the discrete deployment door 19. In another variation, the tear seam 249 may be located on a visible surface 251 of the discrete deployment door 19. During deployment, the tear seam 249 may break apart allowing at least a portion of the cushion assembly 55 to deploy out of the discrete deployment door 19. Note that a tear seam 249 may be present on a discrete deployment door 19 that attaches to the lower module housing body 243, as shown in FIG. 52 or that mounts to the vehicle 13 and surrounding components, such as the deployment door representation in FIGS. 49-50.

In yet another variation, tether 235 may have a curved or hooked end at one or both of the ends that routes through a hole, one slot, or two slots in the mating attachment surface. In another variation, the tether 235 may have a loop in the middle that shortens it in the undeployed state and which pulls out as the tether 235 stretches to full length upon deployment. This loop may be similar to a loop on a coiled spring and the tether material may be made of a spring type of material. In yet another variation the tether 235 may attach to a fender 9, to a flange bent off of the fender 9 edge, to vehicle body 13 attachment, to an adjacent trim piece 359, 369, or a hood 3. It may also be attached to an object attached to one of these items such as for example: to a fastener that at least temporarily joins adjacent components, to a device such as a light, reflector, emblem, or vent attached to the fender 9, and/or to a body mounted bracket.

The module housing 143 may comprise a lower module housing body 243 and a module housing deployment door 19. The lower module housing body 243 may have tabs or hooks 245 which may lock with the module housing deployment door 19 slots or windows 255. Both the tabs 245 and the slots 255 may be configured to be weakened. The face of the module housing deployment door 251 may include tear seams 249 near its perimeter 251 which may break apart during deployment allowing the cushion assembly 55 to deploy out of the module housing 143, a variation of which is illustrated in FIG. 52. The side walls 253 of the module housing deployment door 19 may have tear seams 249 along their perimeters 250 which may break apart during deployment which may allow the cushion assembly 55 to deploy out of the module housing 143, a variation of which is illustrated in FIG. 52.

The module housing 143, may comprise a single unitary piece or may include several pieces which may include angled or curved surfaces and may include optional ribs to form a surface like a ramp to guide and/or direct the cushion 55 to deploy away from adjacent components. Likewise, adjacent components may have similar surfaces included that may be integral to them or separate parts to guide and/or direct the cushion 55 away from them during deployment.

An adjacent trim piece 257 may be located inboard of the fender 9 which may reduce the gap between the vehicle body 13 and the fender 9 under or aft of the hood 3 which may be all or a portion of the deployment door 19, a variation of which is illustrated in FIG. 54. The adjacent trim piece 257 may also reduce the gap to the A-pillar 7. The adjacent trim piece 257 may comprise any of a number of materials including, but not limited, to plastic. The trim piece 257 may be located outboard of the portion of the hood hinge adjacent to it, and/or it may also partially or completely surround it. It may also help direct waterflow off of the windshield 5 and away from the pedestrian protection airbag module 81.

Figure 55:
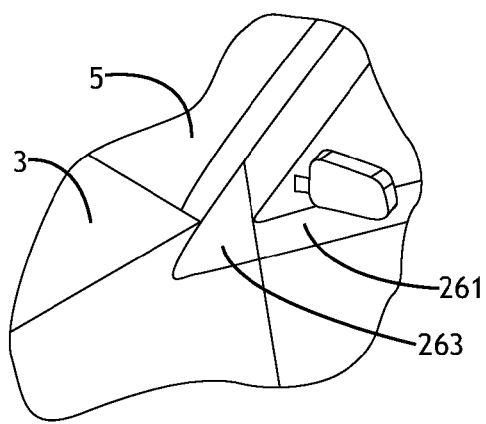
FIG. 55 illustrates a close up of the frontal region of a vehicle according to a number of variations.
Figure 56:
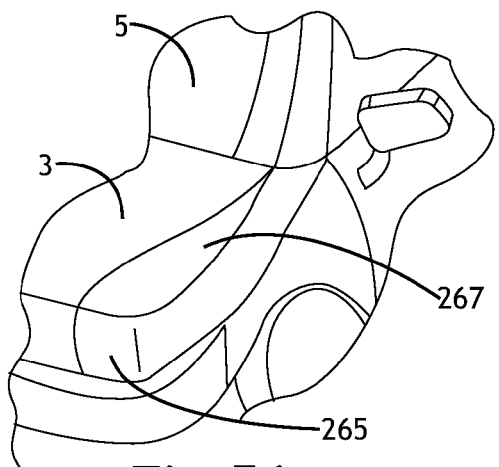
FIG. 56 illustrates a close up of the frontal region of a vehicle according to a number of variations.
Figure 57:
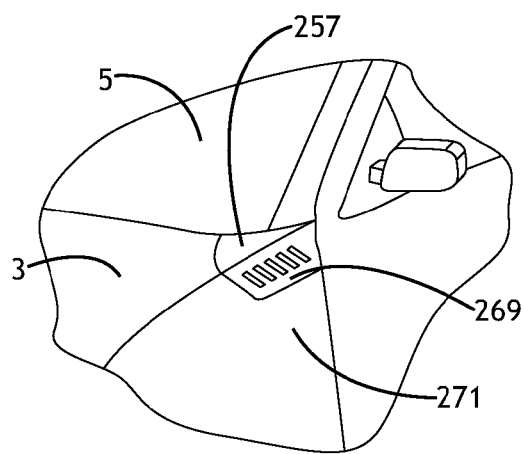
FIG. 57 illustrates a close up of the frontal region of a vehicle according to a number of variations.
Figure 58:
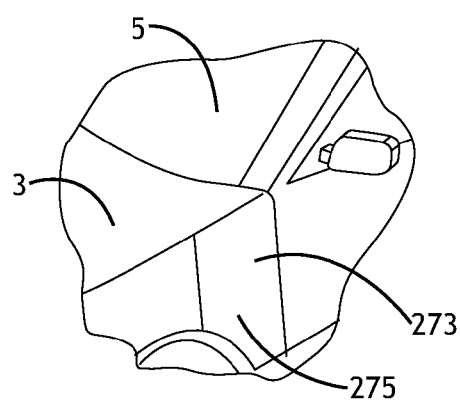
FIG. 58 illustrates a close up of a frontal region of a vehicle according to a number of variations.

Referring to FIGS. 55-58, in a number of variations, the discrete deployment door 19 may be used with any of a number of variations of styling. In one variation, a discrete deployment door 263 may be integrated into the window trim ring 261, a variation of which is illustrated in FIG. 55. In another variation, a discrete deployment door 267 may be integrated into the headlamp area 265 as part of the headlamp or the surrounding trim, a variation of which is illustrated in FIG. 56. In another variation, a discrete deployment door 269 may be integrated into the vent trim 271, a variation of which is illustrated in FIGS. 57 and 52. In another variation, the discrete deployment door 263 may be integrated into the vertical stripe or other geometrical shape of the trim 275, a variation of which is illustrated in FIG. 58. In yet another variation, the deployment door maybe molded or painted a body color or made the color of an adjacent trim piece. It may also be its own color if the design theme enables this. In addition, an adjacent trim piece 257, a variation of which is illustrated in FIG. 57, may be utilized to help cover the outer surface of the vehicle 13 or help guide water away from the pedestrian protection module 81.

Figure 64:
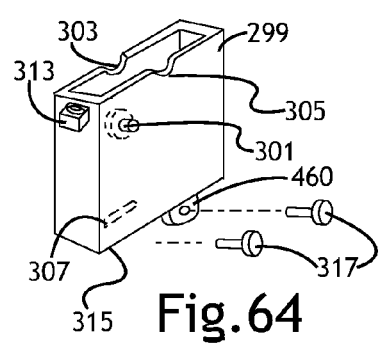
FIG. 64 illustrates an airbag module housing according to a number of variations.

In any of the above variations of the pedestrian protection airbag module housing 143 a structural element 229, a variation of which is illustrated in FIG. 46, may be used in the housing configuration which may help to direct the deploying cushion assembly 55 trajectory. The structural element 229 may also reduce bellmouthing or lateral expansion of the housing. The structural element 229 may completely surround or ring the housing and function like a band of material. Alternatively, it may be a U-shaped piece that is attached to the vehicle body 13 on either side of the module 81 or to a module mounting bracket that is part of the pedestrian protection airbag module 81. The pedestrian protection airbag module housing 143 may be covered at the top to prevent and/or reduce water from entering into the module 81. The module housing 143 may also include a drain hole 244 at the bottom to allow any water that may intrude the module 81 to drain out, a variation of which is illustrated in FIG. 53. In addition, if the surrounding environment is dry enough, the module housing 143 may be of a soft pack construction where it may be formed from a piece of weakened fabric or similar material that is wrapped around it with a perforated or otherwise weakened region on the side through which the airbag 81 is to deploy. Finally, the pedestrian protection airbag module 81 may have a top portion (a variation of which is illustrated in FIG. 64 as 297) between it and the discrete deployment door 19 that may be integral to the module housing 143 or a separate piece sized so that it fits under the deployment door and the vehicle exterior surface. The top portion 297 may partially detach, completely detach, and/or open via a tear seam upon module deployment, as discussed for the actual discrete deployment door 19.

In another variation, a pedestrian protection airbag module 81 may be mounted in the fender region 1 laterally adjacent and below the hood 3 and forward of the vehicle side door 11 which may deploy by causing the fender 9 to open at least a portion of the deployment path for the cushion assembly 55.

Figure 59:
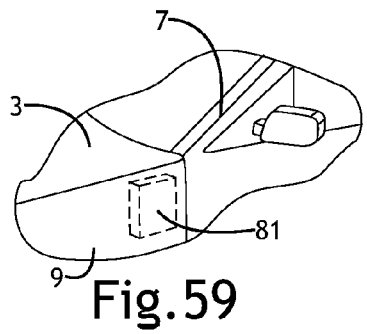
FIG. 59 illustrates a close up of a frontal region of a vehicle according to a number of variations.
Figure 60:
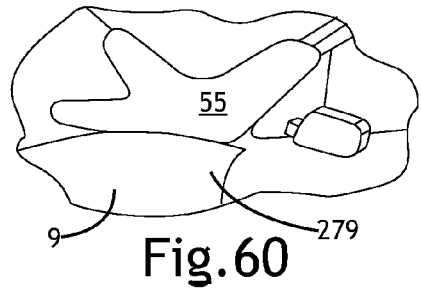
FIG. 60 illustrates an inflated airbag according to a number of variations.
Figure 61:
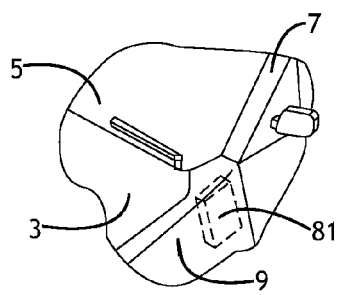
FIG. 61 illustrates a close up of a frontal region of a vehicle according to a number of variations.
Figure 62:
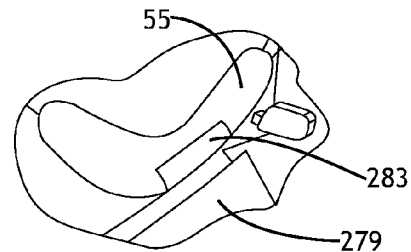
FIG. 62 illustrates an inflated airbag according to a number of variations.

Referring to FIGS. 59-62, in a number of variations, the pedestrian protection airbag module 81 may be located in the fender region 1. A pedestrian protection airbag module 81 may deploy which may cause the cushion assembly 55 to push the fender 9 outward causing the fender 9 to bow or move outward 279, a variation of which is illustrated in FIGS. 60 and 62, partially extend, partially detach, or fully detach from the vehicle body 13. Prior to deployment, the fender 9 may extend between the hood 3 and the A-pillar 7, a variation of which is illustrated in FIG. 61 or may not be present between the hood 3 and the A-pillar 7, a variation of which is illustrated in FIG. 59. An adjacent trim piece may also be located between the fender 9 and hood 3, and depending on geometry also may be located between the fender 9, the hood 3, and the A-Pillar 7, as previously illustrated in FIG. 54. A protective flap 283 may be placed in a variety of locations to provide the cushion assembly 55 with protection from objects on the vehicle 13 and/or the module housing 143 including, but not limited to, on the inboard, outboard, rearward or forward side of the cushion assembly 55, the module housing 143, and/or adjacent a separate piece which may be located between the cushion assembly 55 and the module housing 143.

Figure 63:
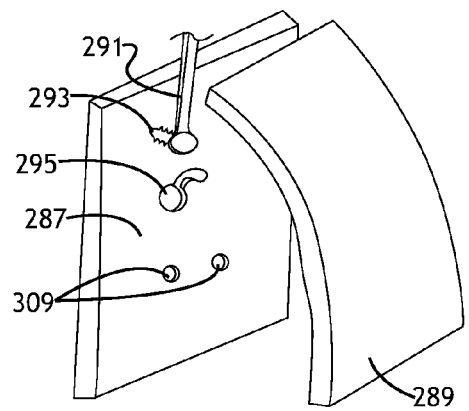
FIG. 63 illustrates a close up of a vehicle body according to a number of variations.

For any of the airbag module 81 configurations herein, the inner structure of the vehicle 287 may be configured to accept a tether or rod 291 which may have a Christmas tree attachment 293, threaded fastener, or other mechanical fastener or fastening element which attaches to the inner vehicle structure 287, a variation of which is illustrated in FIG. 63. The tether or rod 291 may optionally be sandwiched between the inner vehicle structure 287, the module 81, and in some variations the fender 9 (not illustrated). A vertical channel (not illustrated) to recess the tether or rod 291 may be included in one of the mating parts, such as in the inner vehicle structure 287, the module 81, or any number of trim pieces to allow the parts to fit against each other in a flush manner and/or to allow the tether or rod 291 to pass through it or in it. The inner structure 287 may also include a keyhole slot 295 and at least one attachment hole 309 to accept one of the module housing and the tether or rod 291, a variation of which is illustrated in FIG. 64. The module 81 may be installed into the vehicle 13 through the bottom opening around the wheel well with a separate panel which may be installed at the wheel well opening to close out an opening around the vehicle tire.

The module 81 may include a housing 296 having a top portion 297 and a bottom portion 299. The top portion 297 may include one or more tabs 311 which may attach to one or more locking features 313 located on the bottom portion 299. The bottom portion 299 of the housing 296 may also include a key hole slot interface 301 which may mate with the vehicle structure key hole slot 295, a variation of which is illustrated in FIG. 64. The geometry for this attachment feature may be aligned to allow easy insertion with the direction of module insertion and may likely support the module in the installed position before the module fasteners are driven.

Additionally, the bottom portion 299 of the housing 296 may include at least one attachment feature located at the bottom 315 of the bottom portion 299 of the housing 296 which may accept any of a number of fasteners including, but not limited to, at least one bolt 317 which may be attached to the attachment holes 309 located in the inner structure 287 of the vehicle, a variation of which is illustrated in FIG. 64. Optionally, the bolt 317 may be captured in the attachment hole 309 prior to module insertion via a washer element on the bolt stud (not illustrated).

Figure 65:
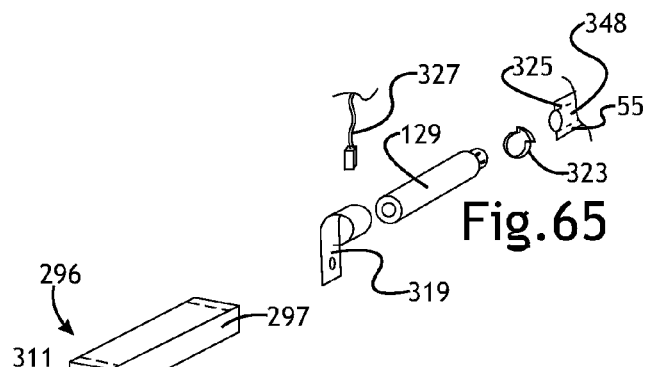
FIG. 65 illustrates various airbag components according to a number of variations.

Referring to FIGS. 26 and 65, an inflator assembly 233 may be assembled to the cushion assembly 55 by attaching the neck 348 of the cushion assembly 55 to the inflator 129, 321 by at least one clamp 323 as discussed above. The inflator 129 may then be attached to the inflator bracket 319 using a crimp, tension from a mechanical fastener which may compress the bracket 319 onto the inflator 129, 321, or an additional mechanical fastener such as another clamp 323. This sub-assembly may then be inserted into the module housing 296 with the inflator bracket 319 extending out of slot 307 at the bottom of the module housing 296. An inflator wire harness 327 may be attached to the inflator 129, 321 and may be used to send a signal from a sensor to deploy the inflator 129. In another variation, the inflator bracket may be part of the module housing 143.

The bottom portion 299 of the module housing 296 may also include a channel 303 located at the top of the bottom portion 299 of the module housing 296 which may be used for a tether 291. An additional channel may be located at a different location such as opposite of the tether channel 303 located at the top 299 of the module housing 296 which may be used for the inflator wire harness 327. The channel may also comprise a hole and may be located elsewhere on the module housing 296. The channels 303 may run along the length of the module housing 296 or between the top portion 297 and bottom portion 299.

Figure 67:
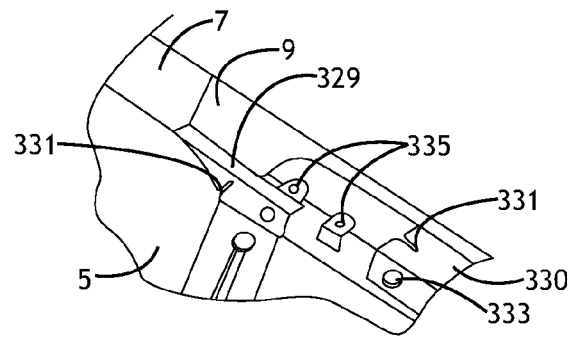
FIG. 67 illustrates a close up of a vehicle underneath the hood according to a number of variations.

Referring to FIGS. 66-71, in a number of variations, the fender 9 sheet metal may be integrated into a deployment door in any of a number of variations. In one variation, at least one trim piece 329, 330 may attach to the fender 9 or abut to the fender 9 at a location between two or more of the following: the fender 9, the windshield 5, the hood 3, the A-pillar 7, and internal vehicle structure which may help close out the deployment door opening, a variation of which is illustrated in FIGS. 66-67. One or more trim pieces 329, 330 may comprise any of a number of materials including, but not limited to rubber or plastic. In one variation, a frangible attachment 333 may be used to attach one or more trim pieces 329, 330 to the fender 9. In another variation, if a frangible attachment 333 is not used to attach the trim pieces 329, 330 to the fender 9, then, as illustrated with trim piece 329, the trim piece 329 may be frangible. One or more trim pieces 329, 330 may also have a notches 331 or other discontinuities which may weaken the structure of the trim pieces 329, 330. The trim pieces 329, 330 may also help cover at least a portion on the hood hinge mechanism 335.

Figure 68:
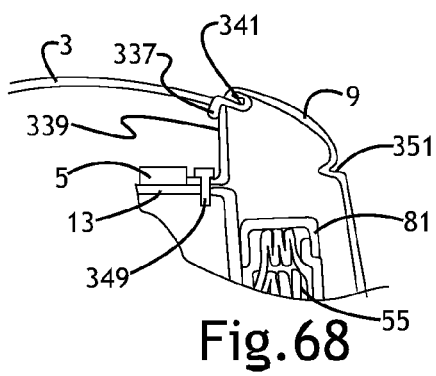
FIG. 68 illustrates a sectional view of a fender and airbag module according to a number of variations.

Referring to FIGS. 68-71, in a number of variations, any number of protectors may be used to shield the edge of the fender 341 so that the edge of the fender 341 does not contact the cushion assembly 55. In one variation, a trim piece 337 may be attached to the edge of the fender 341 which may extend around the fender edge 341 and may also extend downward and/or may shingle a portion of an adjacent trim piece 339, a variation of which is illustrated in FIG. 68. The adjacent trim piece 339 may be attached to the vehicle structure 349 in any of a number of variations underneath the hood 3, such as with one or more threaded or snap-in fasteners 349. The trim piece 337 and the adjacent trim piece 339 may comprise any of a number of materials including, but not limited to plastic or rubber.

In a number of variations, the surface of the fender 9 may act as a deployment door. The fender 9 may include a formation in its sheet metal 351 of varying geometries to provide a hinge which may cause the fender 9 to hinge away from the cushion assembly 55 during deployment and may act as a deployment door, a variation of which is illustrated in FIG. 68. In another variation, the fender 9 and discrete deployment door may be integrated together so that the integrated fender discrete deployment door may include elements of both the fender deployment door and a discrete deployment door.

Figure 69:
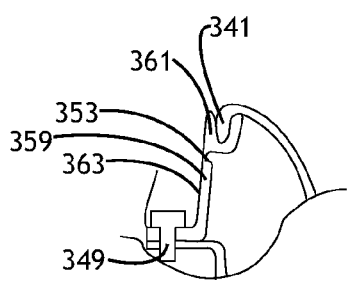
FIG. 69 illustrates a sectional view of a fender according to a number of variations.
Figure 70:
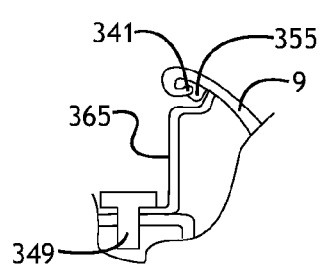
FIG. 70 illustrates a sectional view of a fender according to a number of variations.

In another variation, a frangible feature 353, such as a weakened or thinner portion of material, may be incorporated into a trim piece 359 which may allow the top portion 361 of the trim piece 359 to break free from the bottom piece 363 of the trim piece 359, a variation of which is illustrated in FIG. 69. The top portion 361 of the trim piece 359 may then remain attached to the fender edge 341 which may protect the cushion assembly 55 from contacting the edge 341 of the fender 9 during and after deployment when the frangible feature 353 breaks causing the top portion 361 to separate from the bottom piece 363 as the cushion assembly 55 deploys through this created opening. In another variation, an edge protector 355 may be attached to the edge 341 of the fender 9 and may contact a trim piece 365 which may be configured to mate with and/or shingle under the edge protector 355, a variation of which is illustrated in FIG. 70. This may help protect the cushion assembly 55 from the edge 341 of the fender 9.

Figure 71:
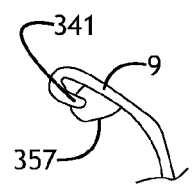
FIG. 71 illustrates a sectional view of a fender according to a number of variations.
Figure 72:
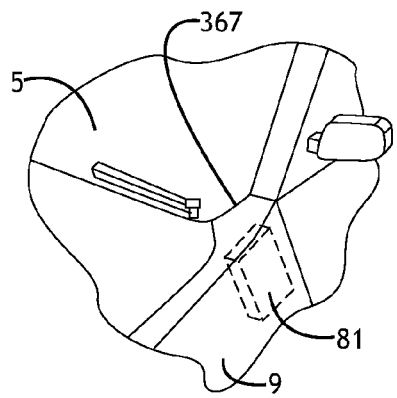
FIG. 72 illustrates a close up of a fender region of a vehicle according to a number of variations.

In another variation, a bead of caulk 357 or similar material may be placed across the edge 341 of the fender 9, a variation of which is illustrated in FIG. 71. This may help protect the cushion assembly 55 from the edge of the fender 341. The trim pieces may have separate fasteners 349 to the vehicle body 13, a variation of which is illustrated in FIGS. 69 and 70, or may have integral fasteners. Any of the materials 337, 361, 355, 357 attached to the edge 341 of the fender 9 may have mechanical grabbing features such as teeth (not illustrated) which may help them stay attached to the fender edge 341

Figure 73:
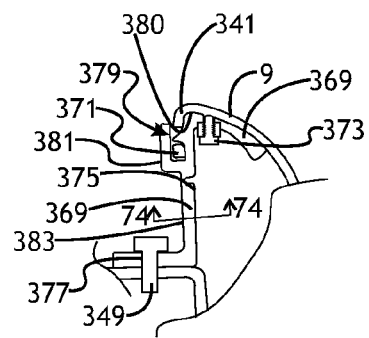
FIG. 73 illustrates a sectional view of a fender region of a vehicle according to a number of variations.

Referring to FIGS. 72-77, in a number of variations, a trim piece 369 may be attached to the fender edge 341 in any of a number of variations including, but not limited to, a threaded fastener 373, by adhesively bonding the trim piece 369 to the fender edge 341, heat staking, or a snap fitting feature 379. In the case of the snap fitting feature 379, a variation of which is illustrated in FIG. 73, the bent lip of the fender 9 may include a slot 380 which the trim piece 369 may snap into. The trim piece 369 may also include a frangible feature 375 such as a weakened or thinner portion of material so that during deployment, the top portion 381 of the trim piece 369 may break free from the bottom portion 383 of the trim piece 369 which may provide the cushion assembly 55 with protection from the fender edge 341.

The trim piece 369 may be attached to the vehicle body 13 in any of a number of variations including, but not limited to a threaded fastener and/or snap-in fastener. In another variation, the trim piece 369 may be attached to the vehicle body 13 using a frangible fastener. In another variation, the fastener used to attach the trim piece 369 may be seated in an oversized hole which may allow the trim piece 369 to rotate (in a clockwise direction) and detach from the fastener as the trim piece 369 is pushed by the deploying cushion assembly 55, a variation of which is illustrated in FIGS. 73-74. The rotated trim piece 369 may provide the cushion assembly 55 with further protection from the edge 341 of the fender 9.

Figure 75:
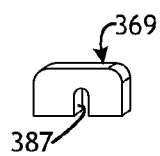
FIG. 75 illustrates a close up of a trim piece feature according to a number of variations.
Figure 76:
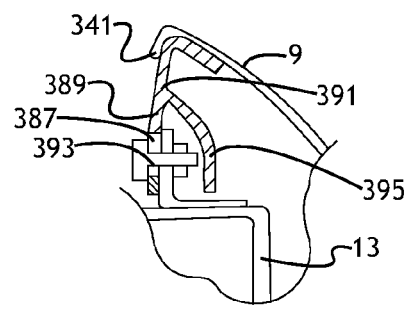
FIG. 76 illustrates a sectional view of a fender region according to a number of variations.

In another variation, a slot 387 may be located in the trim piece 369 which may enable up and down adjustment, a variation of which is illustrated in FIGS. 75-76. In another variation, a trim piece 389 may be configured to include a flap 395 which may shield the trim piece 389 to vehicle structure 13 attachment from the cushion assembly 55, a variation of which is illustrated in FIG. 76.

Figure 77:
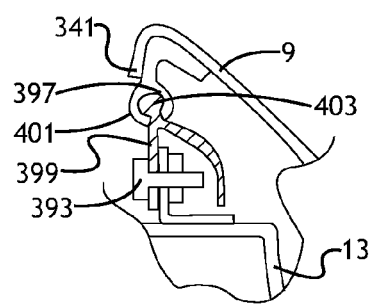
FIG. 77 illustrates a sectional view of a fender region according to a number of variations.

The trim piece 389 may be attached to the vehicle body 13 in any of a number of variations including, but not limited to, a threaded fastener, a push-in fastener, or heat staking. In another variation, an edge protector 397 may be attached to the fender edge 341. The edge protector 397 may include a snap feature 401 and a trim piece 399 may include a snap feature 403 which may snap the two of them together, a variation of which is illustrated in FIG. 77. The fender 9 and the trim piece 399 may be constructed and arranged via their geometry to reduce or prevent water from contacting the pedestrian protection airbag module 81.

Referring to FIGS. 78-81, in a number of variations, a fender integrated deployment door 409 may include any of a number of release options. The fender 9 may be comprised of any of a number of materials including, but not limited to steel, aluminum, plastic, or a composite material.

In one variation, the fender integrated door 409 may have an attachment tab 406 having a hole 407 which may be attached to the sheet metal of the vehicle 13 with the use of a frangible fastener 405, a variation of which is illustrated in FIG. 78. During deployment, the frangible faster 405 may break which may allow the fender integrated sheet metal door 409 to protrude outwards or detach from the vehicle 13.

In another variation, the fender integrated sheet metal door 409 may have an attachment tab 410 with a slot 411. The slot 411 may be larger at the fastener location so that the fender 409 may move outward during deployment and still remain attached at this location. In another variation, the fender integrated sheet metal door 409 may have a tab 412 having an open ended slot or keyhole 413 which may allow the fender to detach from the vehicle body 13 at this location upon deployment, a variation of which is illustrated in FIG. 80. Alternately, an open ended slot or keyhole may be located on the vehicle body 13.

In another variation, a fender integrated door 409 may have an attachment tab 414 having a slot with a frangible web or a partial web 415, a variation of which is illustrated in FIG. 81. This type of slot may also be located on a bracket mounted to the vehicle body 13.

In yet another variation, the features cited in FIGS. 78-81 which enable fender 9 movement during deployment may be located on one or more brackets coming off of the body structure 13 or the body structure 13 itself that in turn mate up to one or more attachment features on the fender 9.

Referring to FIGS. 82-84, in a number of variations, a fender integrated sheet metal deployment door 409 may include at least one tether 417, 419 which may assist in controlling the fender 9 kinematics. In a number of variations, the tether 417 may be attached to at least one of the fender 9, the vehicle structure 13, the hood 3, and/or the airbag module 81. In one variation, a tether 417 may be one piece and may have a hole 425 on each opposing end which may be configured to accept an attachment device 423, a variation of which is illustrated in FIG. 83. An attachment device 423 may be inserted into the tether holes 425 and secured with a lock washer 427 to create a sub-assembly with a captured attachment device 423 which can then be installed to the vehicle.

In another variation, a tether 419 may be made of a flexible material. Each opposite end of the tether 419 may be bent to form a loop 435 which may be secured with a securing component 437, a variation of which is illustrated in FIG. 84. An attachment device 423 may be placed into the loop 435 and secured with a lock washer 427 to create a sub-assembly with a captured attachment device 423 which may then be installed to the vehicle. The first end of the tether 429 may be attached to the fender edge 341 or another location on the fender 9 body with the attachment device 423 and the second end of the tether 431 may be attached to a trim piece 433, a housing 296, or vehicle structure 13 or some other component adjacent to the vehicle structure 13. The attachment device 423 may be any of a number of attachment devices including, but not limited to a bolt or a stud, and a corresponding nut or nut shaped receptacle.

In yet another variation, the tether 417, 419 may have a curved or hooked end at one or both of the ends that routes through a hole, one slot, or two slots in the mating attachment surface. In another variation, the tether 417, 419 may have a loop in the middle that shortens it in the undeployed state and which pulls out as the tether 417, 419 stretches to full length upon deployment. This loop may be similar to a loop on a coiled spring and the tether material may comprise a spring type material. In yet another variation the tether 417, 419 may attach to a fender 9, flange bent off of a fender edge 9, to vehicle body 13 attachment, to an adjacent trim piece 359, 369, and a hood 3. It may also be attached to an object attached to one of these items such as for example: to a fastener that at least temporarily joins adjacent components, to a device such as a light, reflector, emblem, or vent attached to the fender 9, and/or to a body mounted bracket. In another variation the tether 417, 419 may be combined with tether 235 so that both form a continuous element. In yet another variation any of the tethers 417, 419, 235 may be integrated into a vehicle wiring harness that connects to the airbag module 81 or an adjacent electrical component such as a light or a door closure switch.

Referring to FIGS. 85-87, in a number of variations, the fender integrated deployment door hinge may be in any of a variety of configurations. In one variation, a hinge line 443 may be located across the emblem area 439 of the fender 9, a variation of which is illustrated in FIG. 85. In this variation, there may be one or more holes or slots 440 in the emblem pocket 442 that may also help form the integrated deployment door hinge. In a similar manner, the pocket may house a light, reflector, or other styling element.

In another variation, a hinge line 443 may be located across the vent area 269 of the fender 9, a variation of which is illustrated in FIG. 86. A hinge 445 may be formed by the removal or absence of a portion of the underside material of the fender 9, a variation of which is illustrated in FIG. 87. The hinge 445 may also be formed by a large hole in the fender 9 for a feature such as an emblem 439 where the emblem pocket 442 consists of a large hole, or the vent 269, a variation of which is illustrated in FIG. 86.

In another variation, the hinge 445 may be formed by a reduced amount of fiber or the absence of fiber in the hinge region wherein the fender 9 may comprise a composite material.

Referring to FIG. 88, a hood 3 may include a mounted shingling feature 455. The mounted shingling feature 455 may include a trim piece 447 configured to attach to hood 3 in any of a number of variations including, but not limited to, a threaded fastener, bonding, heat staking or a snap feature 451. The mounting shingling feature 455 may also consist of a rolled edge with caulking, similar material and/or a snap-in bead or seal present. This may help in preventing the cushion assembly 55 from deploying underneath the hood 3. A fore-aft reinforcement 449 may be attached to the trim piece 447 which may prevent breakage of the trim piece 447. A mounted shingling feature 455 may also be used on an A-pillar 7 or any adjacent surface which may have an exposed edge. Likewise, the fore-aft reinforcement 449 may be applied to any of the fender shingling concepts herein.

The above description of variations within the scope of the invention is merely illustrative in nature and, thus, variations or variants thereof are not to be regarded as a departure from the spirit and scope of the invention. For instance, any pieces described for the pedestrian protection air bag module 81, the deployment door 19, the fender 9, and any other adjacent pieces or components may be made of more pieces that are attached together, for instance with a different show surface piece and a different substrate or structure piece. In another variation, it may be possible to have both a fender 9 that moves and acts as a deployment door to allow the cushion assembly 55 to deploy and an adjacent deployment door 19 that also simultaneously moves to allow the cushion assembly 55 to deploy where both of these parts move in concert to create an open deployment path.

Variation 1 may include a product comprising: an airbag which propels a moving member that releases a hood hinge mechanism upon deployment and which deploys a cushion to provide pedestrian protection from at least one of a rearward region of the hood, a lower windshield, an A-pillar, an outboard region of a hood, or a fender.

Variation 2 may include a product as set forth in Variation 1 wherein the airbag further comprises an inflator assembly, wherein the inflator assembly has a portion which moves to release the hood hinge mechanism.

Variation 3 may include a product as set forth in Variation 2 wherein the inflator assembly further comprises a telescoping nozzle; wherein the telescoping nozzle moves on the inflator.

Variation 4 may include a product as set forth in Variation 3 wherein the telescoping nozzle is contained within the cushion and pushes on a layer of cushion fabric as it moves and releases a hood hinge mechanism.

Variation 5 may include a product as set forth in Variation 2 wherein the inflator assembly further comprises an inflator body which is slideably disposed via its attachment to the module, and wherein the inflator body physically moves in a controlled manner in its slideable joint.

Variation 6 may include a product as set forth in Variation 1 wherein one of the airbag system or an intermediate piece attached to the airbag system contacts the hood structure to release the hood hinge mechanism.

Variation 7 may include a product as set forth in Variation 1 wherein a portion of the hood hinge mechanism is directly contacted by one of the airbag system or an intermediate piece attached to the airbag system to release it.

Variation 8 may include a product as set forth in Variation 1 wherein the airbag assembly further comprises an inflator assembly, wherein a portion of the inflator assembly movement breaks out a plug in an airbag cover.

Variation 9 may include a product as set forth in Variation 1 wherein the hood hinge mechanism has a fastener which one of shears or deforms to enable the hood hinge release.

Variation 10 may include a product as set forth in Variation 1 wherein the airbag further comprises an inflator, wherein in an inflated state, the cushion is not compressed between the inflator and the hood assembly when the hood is lifted.

Variation 11 may include a product as set forth in Variation 1 wherein the airbag further comprises an inflator, wherein a portion of the cushion in an inflated state is compressed between the inflator and the hood assembly when the hood is lifted.

Variation 12 may include a product as set forth in Variation 1 wherein the airbag further comprises a hood edge protector.

Variation 13 may include a product as set forth in Variation 1 wherein a portion of the airbag cushion deploys below the hood and helps lift it.

Variation 14 may include a product as set forth in Variation 1 wherein at least a portion of the airbag system is located under at least one of the fender or the hood.

Variation 15 may include a product comprising: a hood hinge; wherein the hood hinge includes at least one slot; wherein the at least one slot provides a means for enabling a hood to be raised from an unraised position to a raised position; and wherein the hood hinge is constructed and arranged to remain connected to a vehicle body.

Variation 16 may include a product as set forth in Variation 15 wherein the hood hinge is attached to a hood and wherein at least one external device raises the hood from the unraised position to the raised position.

Variation 17 may include a product as set forth in any of Variations 15-16 further comprising at least one of an anti-reverse travel feature or a travel stop on the hood hinge mechanism.

Variation 18 may include a product as set forth in any of Variations 15-17 wherein the slot is angled to prevent a hood from raising when a front of the hood is contacted when it is in an unraised state.

Variation 19 may include a product as set forth in any of Variations 15-18 further comprising a retention feature to hold a hood in an unraised state.

Variation 20 may include a product as set forth in any of Variations 15-19 further comprising an energy absorption feature which allows a hood to be pushed down in a controlled manner after it has deployed upward.

What is claimed is:
1. A product comprising:
an airbag having an inflator assembly, wherein at least a portion of the inflator assembly moves vertically to release a hood hinge mechanism upon deployment and which inflates a cushion to provide cushion coverage over at least one of a rearward region of a hood, a lower windshield, an A-pillar, an outboard region of the hood, or a fender.

2. The product of claim 1 wherein one of the inflator assembly or an intermediate piece attached to the inflator assembly contacts a hood structure to release the hood hinge mechanism.

3. The product of claim 1 wherein a portion of the hood hinge mechanism is directly contacted by one of the inflator assembly or an intermediate piece attached to the inflator assembly to release it.

4. The product of claim 1 wherein in an inflated state, the cushion is not compressed between the inflator assembly and the hood when the hood is lifted.

5. The product of claim 1 wherein a portion of the cushion in an inflated state is compressed between the inflator assembly and the hood when the hood is lifted.

6. The product of claim 1 wherein a portion of the airbag cushion deploys below the hood and helps lift it.

7. The product of claim 1 wherein at least a portion of the airbag is located under at least one of the fender or the hood.

8. A product comprising:
a hood hinge;
wherein the hood hinge includes at least one vertical slot which is perpendicular to a hood;
wherein the at least one vertical slot is constructed and arranged to allow for movement of the hood from an unraised position to a raised position;
wherein the hood hinge is constructed and arranged to remain connected to a vehicle body; and wherein the hood hinge is attached to the hood and at least one external device raises the hood from the unraised position to the raised position.

9. The product of claim 8 further comprising at least one of an anti-reverse travel feature or a travel stop on the hood hinge mechanism.

10. The product of claim 8 wherein a portion of the slot is angled to prevent the hood from raising when a front of the hood is contacted when it is in an unraised state.

11. The product of claim 8 further comprising a retention feature to hold the hood in an unraised state.

12. The product of claim 8 further comprising an energy absorption feature which allows the hood to be pushed down in a controlled manner after it has deployed upward.

13. A product comprising:
an airbag which propels a moving member that releases a hood hinge mechanism upon deployment and which deploys a cushion to provide pedestrian protection from at least one of a rearward region of a hood, a lower windshield, an A-pillar, an outboard region of the hood, or a fender, wherein the airbag further comprises an inflator assembly, and wherein the inflator assembly has a portion which moves to release the hood hinge mechanism.

14. The product of claim 13 wherein the inflator assembly further comprises a telescoping nozzle; wherein the telescoping nozzle moves on the inflator.

15. The product of claim 14 wherein the telescoping nozzle is contained within the cushion and pushes on a layer of cushion fabric as it moves and releases a hood hinge mechanism.

16. The product of claim 13 wherein the inflator assembly further comprises an inflator body which is slideably disposed via its attachment to the airbag, and wherein the inflator body physically moves in a controlled manner in its slideable joint.

17. A product comprising:
an airbag which propels a moving member that releases a hood hinge mechanism upon deployment and which deploys a cushion to provide pedestrian protection from at least one of a rearward region of a hood, a lower windshield, an A-pillar, an outboard region of the hood, or a fender; wherein the airbag assembly further comprises an inflator assembly, and wherein a portion of the inflator assembly movement breaks out a plug in an airbag cover.

18. A product comprising:
an airbag which propels a moving member that releases a hood hinge mechanism upon deployment and which deploys a cushion to provide pedestrian protection from at least one of a rearward region of a hood, a lower windshield, an A-pillar, an outboard region of the hood, or a fender, and wherein the hood hinge mechanism has a fastener which one of shears or deforms to enable the hood hinge release.

19. A product comprising:
an airbag which propels a moving member that releases a hood hinge mechanism upon deployment and which deploys a cushion to provide pedestrian protection from at least one of a rearward region of a hood, a lower windshield, an A-pillar, an outboard region of the hood, or a fender, where the airbag further comprises a hood edge protector.

* * * * *